US009527586B2

(12) United States Patent
Levien et al.

(10) Patent No.: US 9,527,586 B2
(45) Date of Patent: Dec. 27, 2016

(54) INTER-VEHICLE FLIGHT ATTRIBUTE COMMUNICATION FOR AN UNOCCUPIED FLYING VEHICLE (UFV)

(71) Applicant: Elwha LLC, Bellevue, WA (US)

(72) Inventors: Royce A. Levien, Lexington, MA (US); Robert W. Lord, Seattle, WA (US); Richard T. Lord, Tacoma, WA (US); Mark A. Malamud, Seattle, WA (US); John D. Rinaldo, Jr., Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 51 days.

(21) Appl. No.: 13/728,642

(22) Filed: Dec. 27, 2012

(65) Prior Publication Data

US 2014/0277834 A1    Sep. 18, 2014

Related U.S. Application Data

(63) Continuation-in-part of application No. 13/722,874, filed on Dec. 20, 2012, which is a continuation-in-part of application No. 13/720,694, filed on Dec. 19, 2012.

(51) Int. Cl.
*B64C 39/02* (2006.01)
*G05D 1/10* (2006.01)

(52) U.S. Cl.
CPC ............. *B64C 39/024* (2013.01); *G05D 1/104* (2013.01); *B64C 2201/143* (2013.01)

(58) Field of Classification Search
CPC ............. B64C 39/024; B64C 2201/143; B64C 2201/146; B64C 2201/141; G08G 5/0069; G08G 5/0091; G05D 1/0027

USPC .......................................................... 701/2
See application file for complete search history.

(56) References Cited

U.S. PATENT DOCUMENTS

| | | | |
|---|---|---|---|
| 4,964,837 | A | 10/1990 | Collier |
| 5,581,250 | A | 12/1996 | Khvilivitzky |
| 6,694,228 | B2 | 2/2004 | Rios |
| 6,786,213 | B1 | 9/2004 | Lee |
| 6,804,607 | B1 | 10/2004 | Wood |
| 6,896,220 | B2 | 5/2005 | McKendree et al. |
| 6,952,001 | B2 | 10/2005 | McKendree et al. |
| 6,980,151 | B1 | 12/2005 | Mohan |

(Continued)

OTHER PUBLICATIONS

"Physics-Based Approach to Chemical Source Localization Using Mobile Robotic Swarms" by Dimitri Zarzhitsky; a dissertation submitted to the Department of Computer Science and The Graduate School of The University of Wyoming; Aug. 2008.*

(Continued)

*Primary Examiner* — Anne M Antonucci

(57) ABSTRACT

Disclosed herein are example embodiments for inter-vehicle flight attribute communication for an unoccupied flying vehicle (UFV). For certain example embodiments, at least one machine may: (i) obtain at least one indication related to imparting at least one flight attribute corresponding to a UFV; or (ii) transmit to a remote UFV at least one indicator of at least one flight attribute corresponding to a UFV based at least partially on at least one indication related to imparting at least one flight attribute. However, claimed subject matter is not limited to any particular described embodiments, implementations, examples, or so forth.

32 Claims, 20 Drawing Sheets

(56) References Cited

U.S. PATENT DOCUMENTS

| | | | |
|---|---|---|---|
| 7,024,309 B2 | 4/2006 | Doane | |
| 7,039,367 B1 | 5/2006 | Kucik | |
| 7,299,130 B2 | 11/2007 | Mulligan et al. | |
| 7,437,225 B1 | 10/2008 | Rathinam | |
| 7,542,828 B2 | 6/2009 | Steele et al. | |
| 7,693,624 B2 | 4/2010 | Duggan et al. | |
| 7,737,878 B2 | 6/2010 | van Tooren et al. | |
| 7,747,364 B2 | 6/2010 | Roy et al. | |
| 7,876,258 B2 | 1/2011 | Abraham et al. | |
| 7,953,524 B1 | 5/2011 | Roggendorf | |
| 7,969,346 B2 | 6/2011 | Franceschini et al. | |
| 7,970,506 B2 | 6/2011 | DeMarco et al. | |
| 8,060,270 B2 | 11/2011 | Vian et al. | |
| 8,068,949 B2 | 11/2011 | Duggan et al. | |
| 8,086,351 B2 | 12/2011 | Gaudiano et al. | |
| 8,103,398 B2 | 1/2012 | Duggan et al. | |
| 8,380,367 B2 | 2/2013 | Schultz et al. | |
| 8,471,186 B2 | 6/2013 | Wallis | |
| 8,700,306 B2 | 4/2014 | Duggan et al. | |
| 2001/0044444 A1 | 11/2001 | Mahe et al. | |
| 2003/0014165 A1 | 1/2003 | Baker et al. | |
| 2003/0135762 A1 | 7/2003 | Macaulay | |
| 2004/0193334 A1 | 9/2004 | Carlsson et al. | |
| 2004/0249519 A1 | 12/2004 | Frink | |
| 2005/0004723 A1 | 1/2005 | Duggan et al. | |
| 2005/0077424 A1 | 4/2005 | Schneider | |
| 2005/0090945 A1 | 4/2005 | Bodin et al. | |
| 2005/0136891 A1 | 6/2005 | Wang et al. | |
| 2005/0197749 A1 | 9/2005 | Nichols et al. | |
| 2006/0058928 A1* | 3/2006 | Beard et al. | 701/11 |
| 2006/0058931 A1 | 3/2006 | Ariyur et al. | |
| 2006/0089766 A1 | 4/2006 | Allard et al. | |
| 2006/0097895 A1 | 5/2006 | Reynolds et al. | |
| 2006/0167596 A1 | 7/2006 | Bodin et al. | |
| 2006/0238414 A1 | 10/2006 | Miyamoto et al. | |
| 2006/0249622 A1 | 11/2006 | Steele | |
| 2006/0271248 A1 | 11/2006 | Cosgrove et al. | |
| 2006/0287824 A1 | 12/2006 | Lin | |
| 2007/0106473 A1 | 5/2007 | Bodin et al. | |
| 2007/0139252 A1 | 6/2007 | Barry et al. | |
| 2007/0152814 A1 | 7/2007 | Stefani | |
| 2007/0168090 A1 | 7/2007 | DeMarco et al. | |
| 2007/0210953 A1 | 9/2007 | Abraham et al. | |
| 2008/0033604 A1 | 2/2008 | Margolin | |
| 2008/0055149 A1 | 3/2008 | Rees et al. | |
| 2008/0125933 A1 | 5/2008 | Williams et al. | |
| 2008/0190274 A1 | 8/2008 | Kirkpatrick | |
| 2008/0249669 A1 | 10/2008 | Skarman | |
| 2008/0255711 A1 | 10/2008 | Matos | |
| 2009/0027253 A1 | 1/2009 | Van Tooren et al. | |
| 2009/0102630 A1 | 4/2009 | Nordlund et al. | |
| 2009/0118896 A1* | 5/2009 | Gustafsson | 701/29 |
| 2009/0125221 A1 | 5/2009 | Estkowski et al. | |
| 2009/0134981 A1* | 5/2009 | Shafaat | G08G 5/0008 340/313 |
| 2009/0210109 A1 | 8/2009 | Ravenscroft | |
| 2009/0222148 A1 | 9/2009 | Knotts et al. | |
| 2009/0318138 A1 | 12/2009 | Zeng et al. | |
| 2009/0319100 A1 | 12/2009 | Kale et al. | |
| 2010/0004798 A1 | 1/2010 | Bodin et al. | |
| 2010/0049376 A1 | 2/2010 | Schultz | |
| 2010/0084513 A1* | 4/2010 | Gariepy et al. | 244/190 |
| 2010/0100269 A1 | 4/2010 | Ekhaguere et al. | |
| 2010/0121574 A1* | 5/2010 | Ariyur et al. | 701/301 |
| 2010/0131121 A1 | 5/2010 | Gerlock | |
| 2010/0163621 A1 | 7/2010 | Ben-Asher et al. | |
| 2010/0198514 A1 | 8/2010 | Miralles | |
| 2010/0204867 A1 | 8/2010 | Longstaff | |
| 2010/0224732 A1* | 9/2010 | Olson et al. | 244/190 |
| 2010/0250022 A1* | 9/2010 | Hines et al. | 701/2 |
| 2010/0292871 A1 | 11/2010 | Schultz et al. | |
| 2010/0292874 A1 | 11/2010 | Duggan et al. | |
| 2010/0302359 A1 | 12/2010 | Adams et al. | |
| 2010/0332136 A1 | 12/2010 | Duggan et al. | |
| 2011/0035149 A1 | 2/2011 | McAndrew et al. | |
| 2011/0118981 A1 | 5/2011 | Chamlou | |
| 2011/0134249 A1 | 6/2011 | Wood et al. | |
| 2011/0169943 A1 | 7/2011 | Bachman, II et al. | |
| 2012/0016534 A1* | 1/2012 | Lee et al. | 701/2 |
| 2012/0022719 A1 | 1/2012 | Matos | |
| 2012/0083947 A1 | 4/2012 | Anderson et al. | |
| 2012/0089274 A1 | 4/2012 | Lee et al. | |
| 2012/0092208 A1 | 4/2012 | LeMire et al. | |
| 2012/0106800 A1 | 5/2012 | Khan et al. | |
| 2012/0123628 A1 | 5/2012 | Duggan et al. | |
| 2012/0143482 A1 | 6/2012 | Gossen et al. | |
| 2012/0167207 A1 | 6/2012 | Beckley et al. | |
| 2012/0187243 A1 | 7/2012 | Goldie et al. | |
| 2012/0200404 A1 | 8/2012 | Morris | |
| 2012/0210853 A1 | 8/2012 | Abershitz et al. | |
| 2012/0221168 A1 | 8/2012 | Zeng et al. | |
| 2012/0296497 A1* | 11/2012 | Lee et al. | 701/3 |
| 2013/0197739 A1 | 8/2013 | Gallagher et al. | |
| 2013/0211656 A1 | 8/2013 | An et al. | |

OTHER PUBLICATIONS

"A Swarm of Nano Quadrotors", YouTube.com, http://www.youtube.com/watch?v=YQIMGV5vtd4, Jan. 31, 2012.

"Collision Avoidance—Where We Are: Detect See and Avoid versus See and Avoid", UAV MarketSpace Developing Commercial UAV Applications, http://www.uavm.com/uavregulatory/collisionavoidance.html, Dec. 5, 2012, pp. 1-5.

"Drone Hijacking? That's Just the Start of GPS Troubles", Danger Room Wired.com, http://www.wired.com/dangerroom/2012/07/drone-hijacking/all/, Jan. 11, 2013, pp. 1-4.

"Most U.S. Drones Openly Broadcast Secret Video Feeds", Danger Room Wired.com, http://www.wired.com/dangerroom/2012/10/hack-proof-drone, Jan. 11, 2013, pp. 1-4.

"Pentagon Looks to Fix 'Pervasive Vulnerability' in Drones", Danger Room Wired.com, http://www.wired.com/dangerroom/2012/12/darpa-drones/, Jan. 11, 2013, pp. 1-5.

"Robot Quadrotors Perform James Bond Theme", YouTube.com, http://www.youtube.com/watch?vs=sUeGc-8dyk, Feb. 28, 2012.

"Unmanned aerial vehicle", Wikipedia, http://en.wikipedia.org/wiki/Unmanned_aerial_vehicle, Dec. 3, 2012, pp. 1-21.

"Vijay Kumar: Robots that fly . . . and cooperate", TED.com; http://www.ted.com/talks/vjay_kumar_robots_that_fly_and_cooperate.htm, Mar. 2012.

Albaker; Rahim; "Autonomous unmanned aircraft collision avoidance system based on geometric intersection", International Journal of the Physical Sciences, Feb. 4, 2011, vol. 6, pp. 391-401.

Anderson, Chris; "How I Accidentally Kickstarted the Domestric Drone Boom", Danger Room Wired.com, http://www.wired.com/dangerroom/2012/06/ff_drones/all/, Dec. 6, 2012, pp. 1-10.

Bai; Hsu; Kochenderfer; Lee; "Unmanned Aircraft Collision Avoidance using Continuous-State POMDPs", National University of Singapore School of Computing;, https://www1.comp.nus.edu.sg/~leews/publications/rss11.pdf, Dec. 3, 2012.

Dean, Stephen; "Drone crashes into SWAT team tank during police test near Houston", Examiner.com, http://www.examiner.com/page-one-in-houston/drone-crashes-into-swat-team-tank-during-police-test-near-houston, Mar. 20, 2012, pp. 1-4.

Federal Aviation Administration; DOT Regs 14-CFR-91 Subchapter-F Subpart-B Flight Rules; Dec. 15, 2013 pp. 711-738.

Geyer; Singh; Chamerlain; "Avoiding Collisions Between Aircraft: State of the Art and Requirements for UAVs operating in Civilian Airspace", Robotics Institute, Carnegie Mellon University, Jan. 2008, pp. 1-19 Pittsburgh, Pennsylvania.

Gruen, Armin; "First Civilian Photogrammetric UAV Flight Over Singapore", Sensors & Systems, http://sensorsandsystems.com/article/features/26474-first-civilian-photogrammetric-uav-flig, Mar. 26, 2012; pp. 1-7.

Leopold, George; "U.S. to begin testing future drones", EE Times, http://www.eetimes.com/General/PrintView/4237809, Mar. 9, 2012, pp. 1.

Montgomery; Johnson; Roumeliotis; Matthies; "The JPL Autonomous Helicopter Testbed: A Platform for Planetary Exploration

(56) References Cited

OTHER PUBLICATIONS

Technology Research and Development", Journal of Field Robotics, vol. 23(3), Dec. 3, 2012, Wiley Periodicals, Inc.
Subbaraman, Nidhi; "Drones over America: How unmanned fliers are already helping cops", NBC News.com, http://www.nbcnews.com/technology/drones-over-america-how-unmanned-fliers-are-already-helping-cops-1C9135554, Mar. 30, 201, pp. 1-5.

* cited by examiner

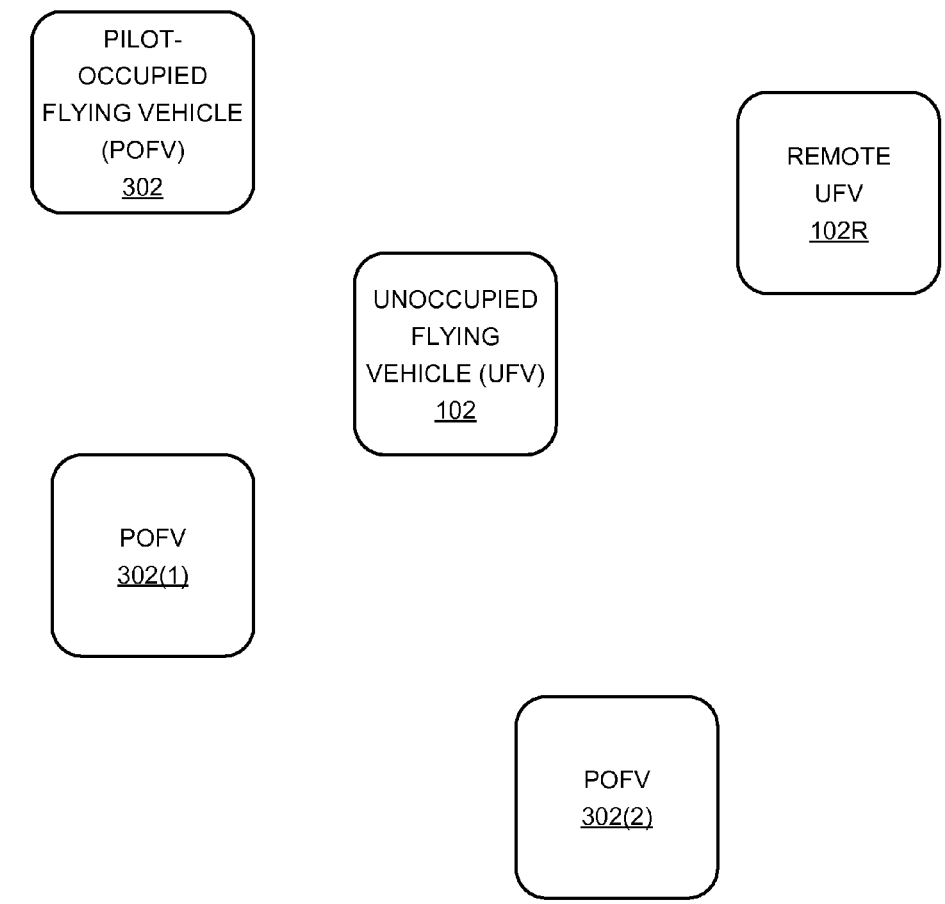
FIG. 3A

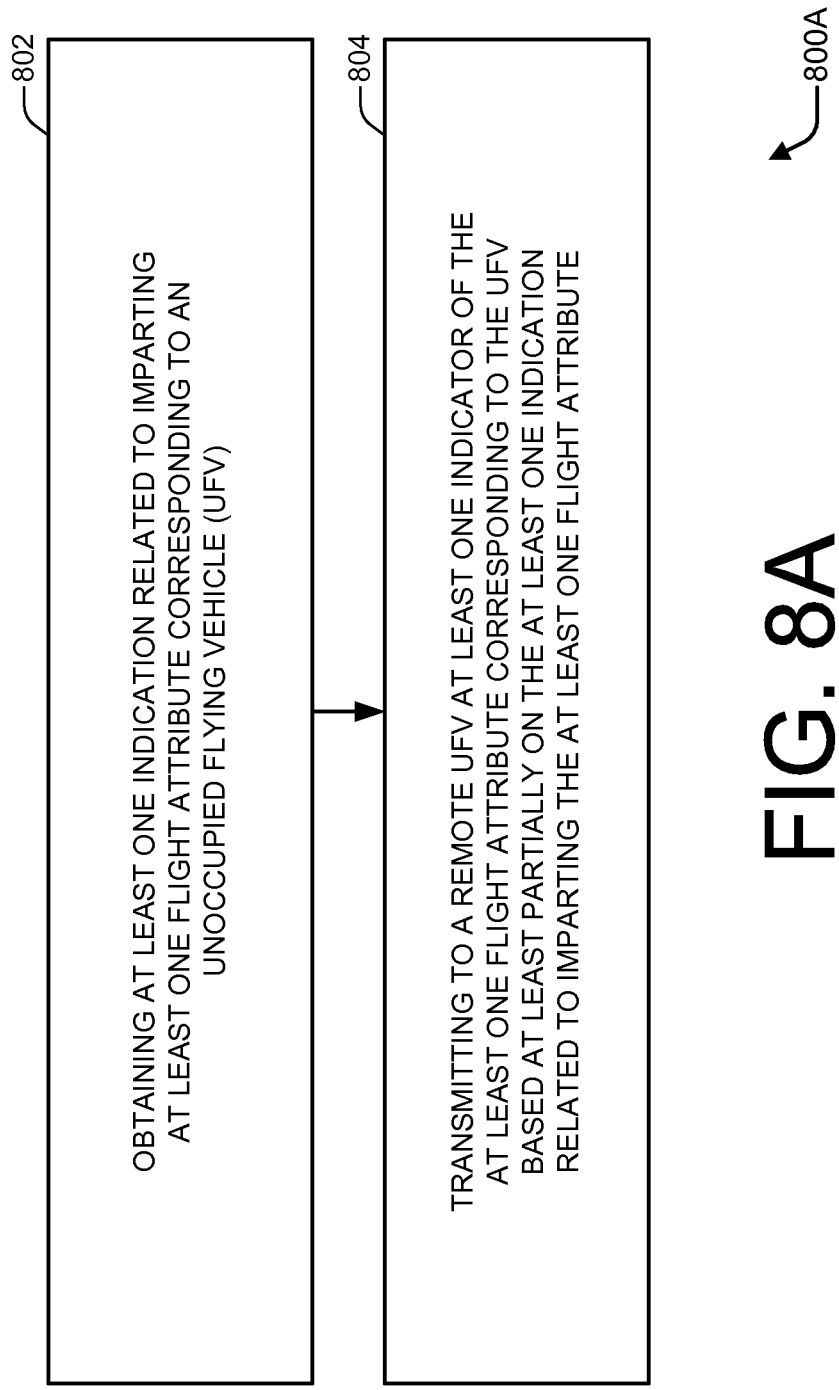

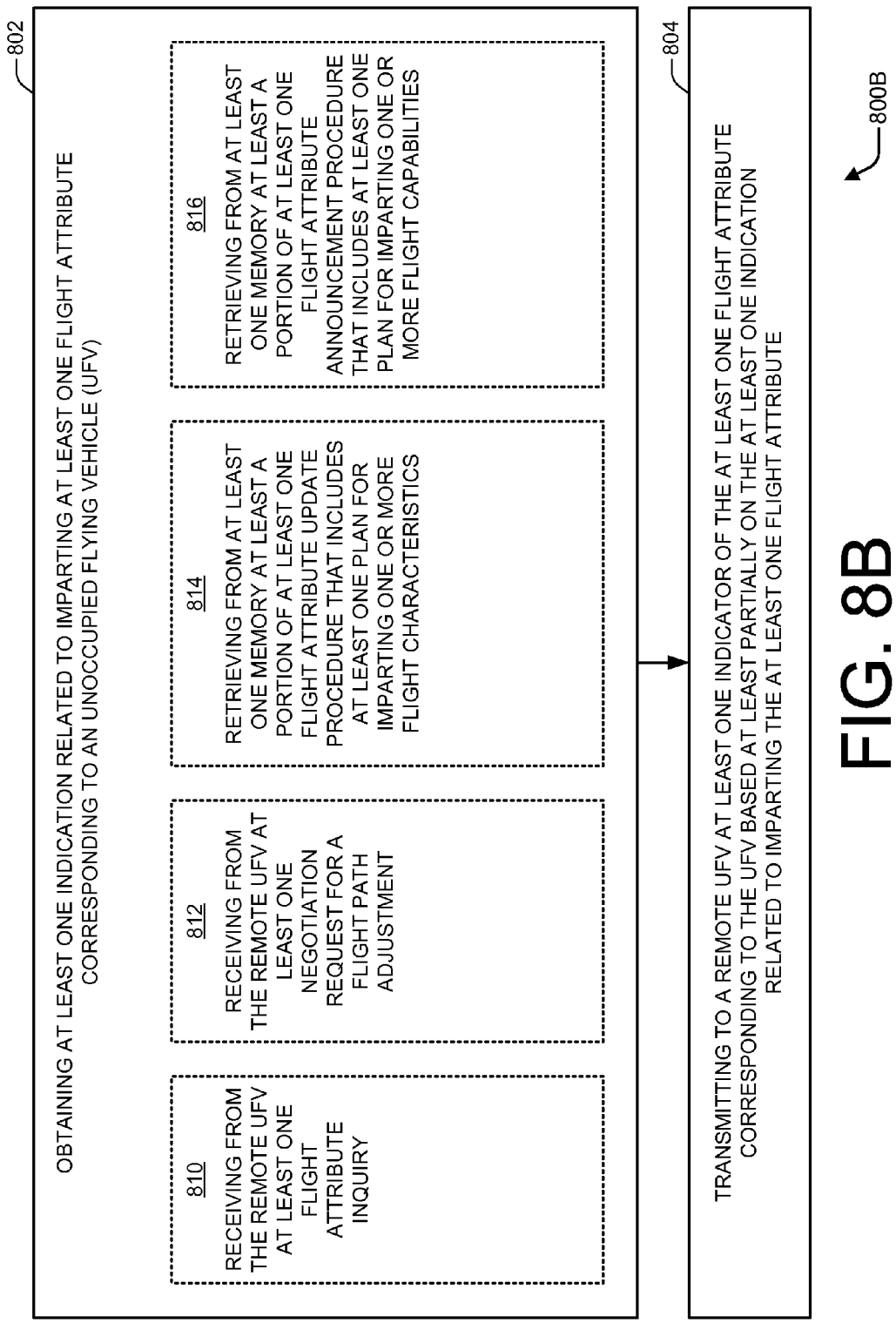

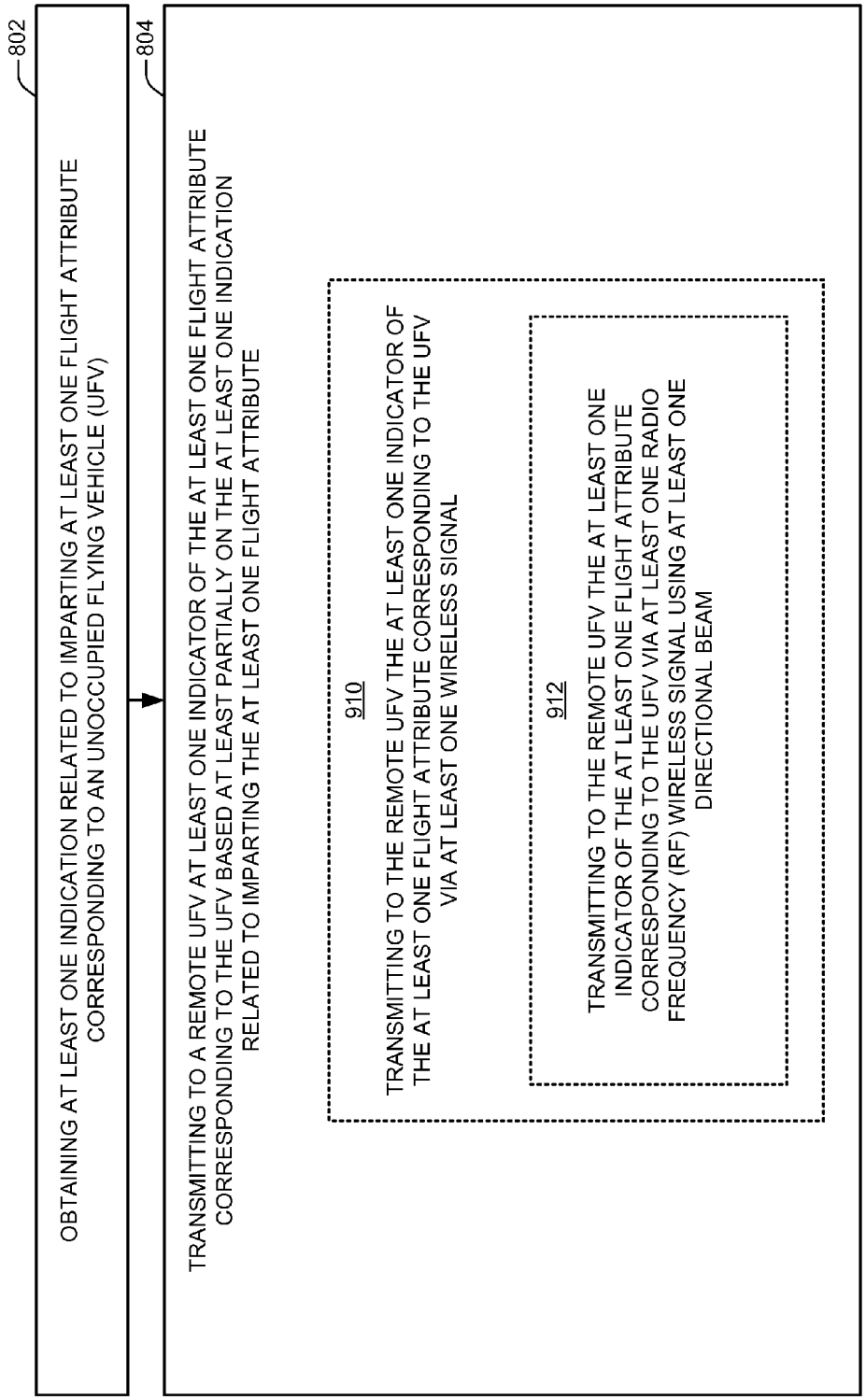

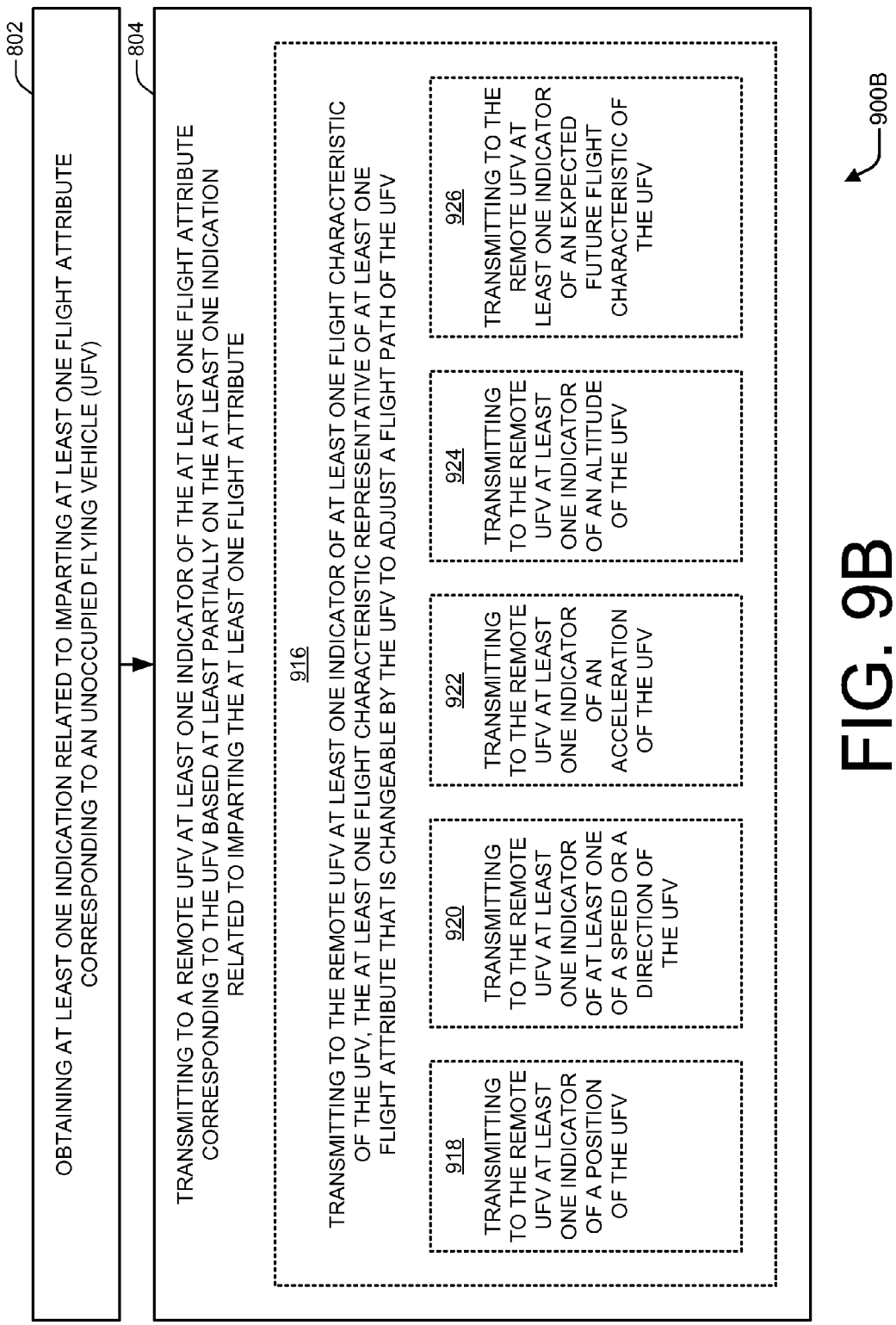

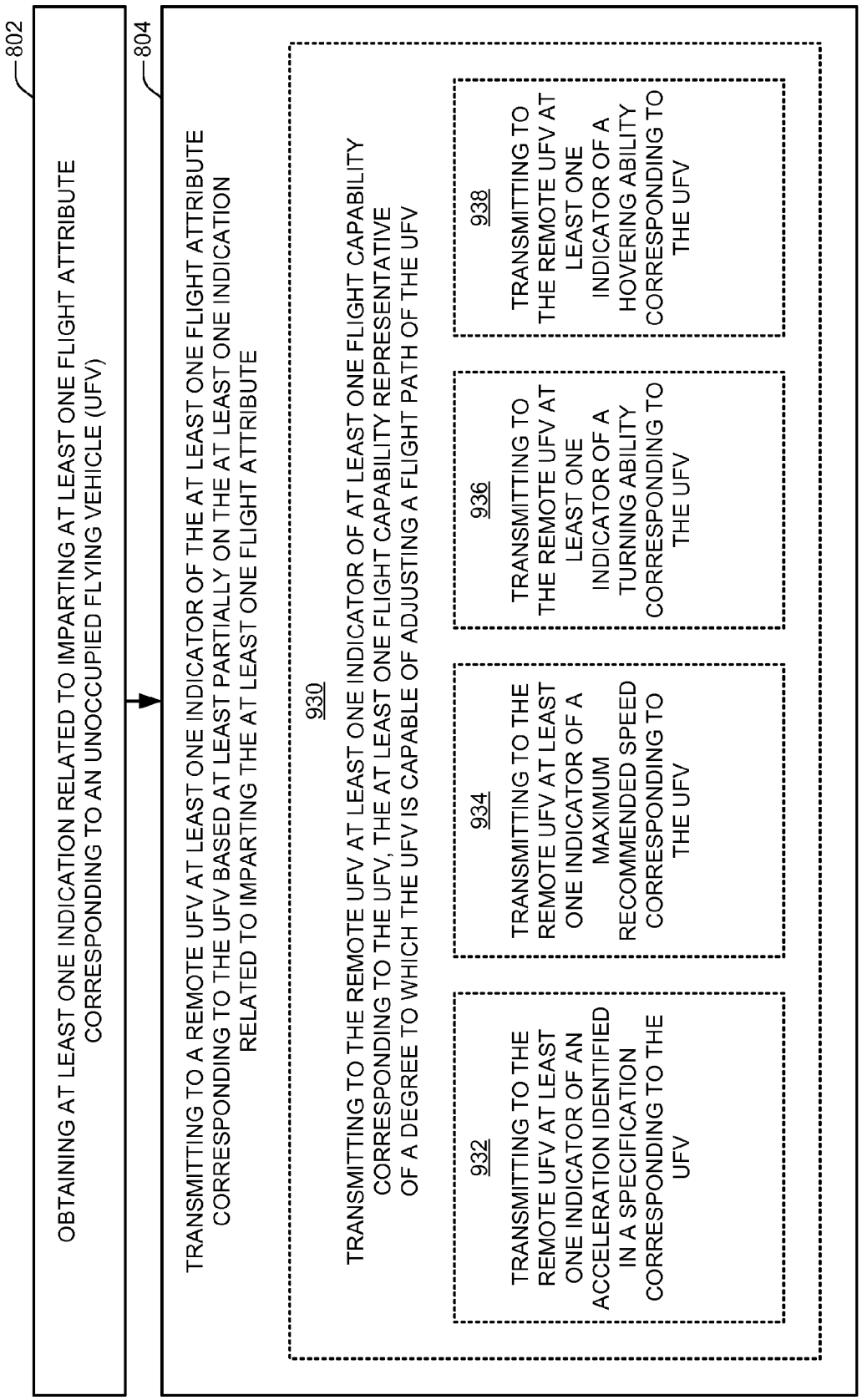

INTER-VEHICLE FLIGHT ATTRIBUTE COMMUNICATION FOR AN UNOCCUPIED FLYING VEHICLE (UFV)

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 13/720,694, entitled "Inter-Vehicle Communication for Hazard Handling for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 19 Dec. 2012, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 13/722,874, entitled "Unoccupied Flying Vehicle (UFV) Inter-Vehicle Communication for Hazard Handling", naming Royce A. Levien, Richard T. Lord, Robert W. Lord, Mark A. Malamud, John D. Rinaldo, Jr., and Lowell L. Wood, Jr. as inventors, filed 20 Dec. 2012 , which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIGS. 3A-3C are schematic diagrams of example UFV hazard handling scenarios or environments in accordance with certain example embodiments.

FIG. 8A is a flow diagram illustrating an example method for at least one machine with regard to inter-vehicle flight attribute communication for a UFV in accordance with certain example embodiments.

FIG. 8B depicts example additions or alternatives for a flow diagram of FIG. 8A in accordance with certain example embodiments.

FIGS. 9A-9D depict example additions or alternatives for a flow diagram of FIG. 8A in accordance with certain example embodiments.

DETAILED DESCRIPTION

Figure 1:
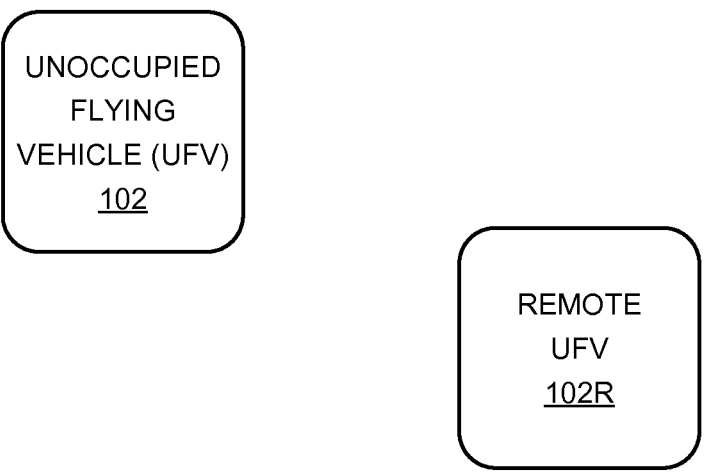
FIG. 1 is a schematic diagram of at least one unoccupied flying vehicle (UFV) in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of at least one unoccupied flying vehicle (UFV) in accordance with certain example embodiments. As shown in FIG. 1, by way of example but not limitation, schematic diagram 100 may include at least one unoccupied flying vehicle (UFV) 102 or at least one remote UFV 102R. For certain example implementations, any particular UFV: may be, comprise, or include a UFV 102, such as a local UFV, or may be, comprise, or include a remote UFV 102R. A given UFV scenario may be considered, analyzed, operated, viewed, or a combination thereof, etc. from a perspective of at least one local UFV 102 with regard to one or more remote UFVs 102R. Disclosure herein or in the accompany drawings, which form a part hereof, that is directed to a UFV 102 may additionally or alternatively be applicable to a remote UFV 102R, unless context dictates otherwise. However, claimed subject matter is not limited to any particular described embodiments, implementations, examples, etc.

For certain example embodiments, a UFV 102 may comprise or include a vehicle that is not capable of being occupied by a human pilot (e.g., due to size, shape, power, atmospheric pressure, or a combination thereof, etc. constraints), a vehicle that is not designed to seat or otherwise safely support a person, a vehicle that is not controllable by an onboard human pilot, a vehicle that is being autonomously controlled at least partially by at least one onboard module, a vehicle that is being autonomously controlled at least partially by at least one off-board module, a combination thereof, or so forth. For certain example embodiments, a UFV 102 may be at least comparable to or may comprise or include at least a portion of any one or more of: an unmanned aerial vehicle (UAV), a remotely piloted vehicle (RPV), an unmanned combat air vehicle (UCAV), an unmanned aircraft (UA), a drone, an optionally-piloted vehicle (OPV) that is not currently being controlled by an on-board pilot, a remotely piloted aircraft (RPA), a remotely operated aircraft (ROA), a radio-controlled aircraft (R/C aircraft), an unmanned-aircraft vehicle system (UAVS), an unmanned aircraft system (UAS), a small unmanned air system (sUAS), a combination thereof, or so forth. For certain example embodiments, a UFV 102 may fly through a fluid (e.g., the earth's atmosphere or the air), through at least a partial vacuum (e.g., space or near-earth orbit), a combination thereof, or so forth. However, claimed subject matter is not limited to any particular described embodiments, implementations, examples, etc.

Figure 2:
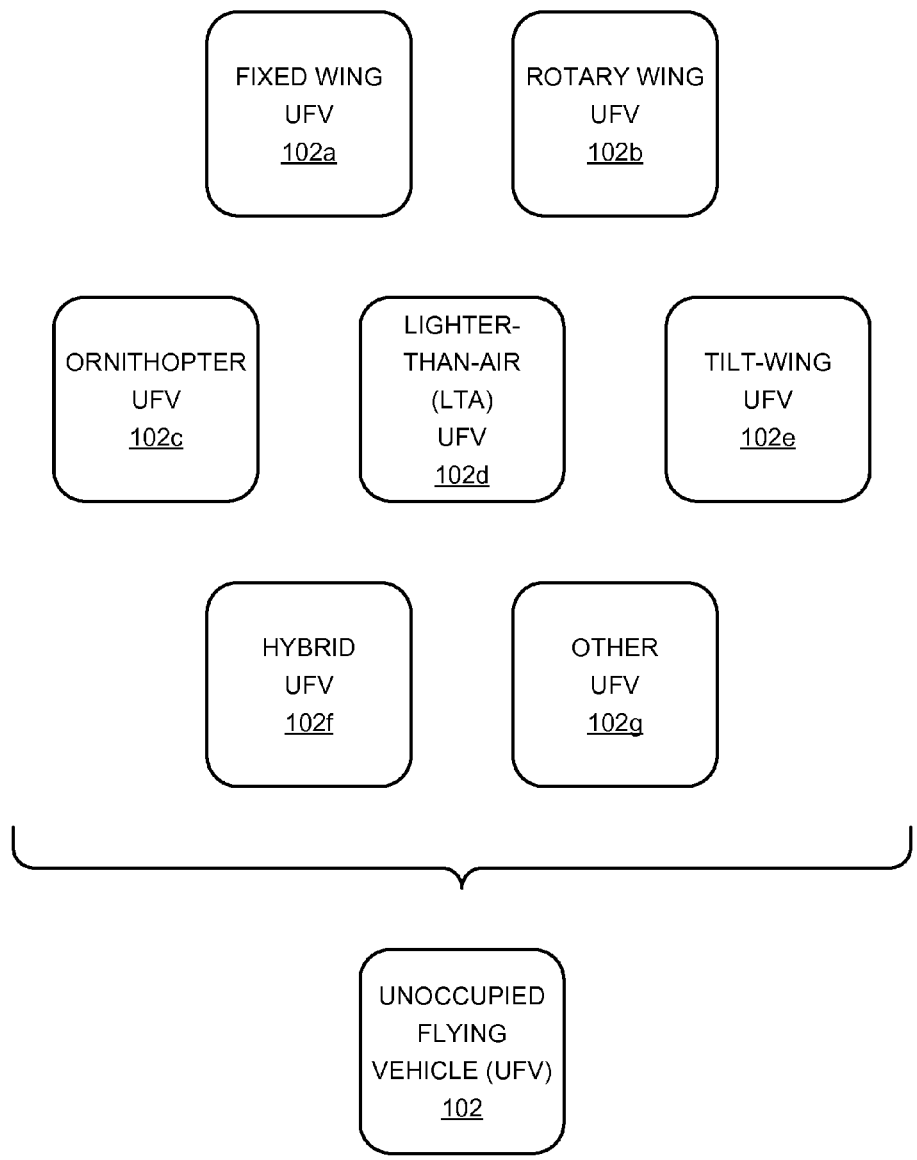
FIG. 2 is a schematic diagram of example realizations for at least one UFV in accordance with certain example embodiments.

FIG. 2 is a schematic diagram 200 of example realizations for at least one UFV in accordance with certain example embodiments. As shown in FIG. 2, by way of example but not limitation, schematic diagram 200 may include at least one unoccupied flying vehicle (UFV) 102, at least one fixed wing UFV 102a, at least one rotary wing UFV 102b, at least one ornithopter UFV 102c, at least one lighter-than-air (LTA) UFV 102d, at least one tilt-wing UFV 102e, at least one hybrid UFV 102f, or at least one other type of UFV 102g. However, claimed subject matter is not limited to any particular described embodiments, implementations, examples, etc.

For certain example embodiments, a UFV 102 may be realized as described by any one or more of the examples in this paragraph. First, a UFV 102 may be realized as a fixed wing UFV 102a, such as a propeller-driven biplane or a jet plane. Second, a UFV 102 may be realized as a rotary wing UFV 102b, such as a helicopter or a gyrodyne. Third, a UFV 102 may be realized as an ornithopter UFV 102c, such as small craft that has flapping wings like an animal (e.g., like a dragonfly, bee, bird, or bat, etc.). Fourth, a UFV 102 may be realized as an LTA UFV 102d, such as a blimp, a balloon, or a dirigible. Fifth, a UFV 102 may be realized as a tilt-wing UFV 102e, such as a propeller-driven airplane with wings that rotate at least during vertical takeoff or landing. Sixth, a UFV 102 may be realized as a hybrid UFV 102f that combines one or more capabilities or structural characteristics of at least one fixed wing UFV 102a, at least one rotary wing UFV 102b, at least one ornithopter UFV 102c, at least one LTA UFV 102d, at least one tilt-wing UFV 102e, or at least one other UFV 102g. Seventh, a UFV 102 may be realized as an other type of UFV 102g, such as a tilt-rotor craft, a submarine, a rocket, a spaceship, a satellite, a vertical take-off and landing (VTOL) craft, a combination thereof, or so forth. However, claimed subject matter is not limited to any particular described embodiments, implementations, examples, etc.

For certain example embodiments, a UFV 102 may additionally or alternatively be realized so as to have one or more features, capabilities, structural characteristics, or a combination thereof, etc. as described by any one or more of the examples in this paragraph. First, a UFV 102 may include one rotor, two rotors (e.g., in a tandem, transverse, coaxial, or intermeshing, etc. configuration), three rotors, four rotors (e.g., a quadcopter, or a quadrotor, etc.), a combination thereof, or so forth. Second, a UFV 102 may include a propeller engine, a jet engine, an electric engine, a rocket engine, a ramjet or scramjet engine, a combination thereof, or so forth. Third, a UFV 102 may have at least one wing (e.g., a monoplane, a biplane, or a triplane, etc. in a stacked or tandem wing configuration), which may include a straight wing, a swept wing, a delta wing, a variable sweep wing, a combination thereof, or so forth. Fourth, a UFV 102 may be realized as having a fuselage, as having a flying wing structure, as having a blended-wing body, a combination thereof, or so forth. However, claimed subject matter is not limited to any particular described embodiments, implementations, examples, etc.

Figure 3B:
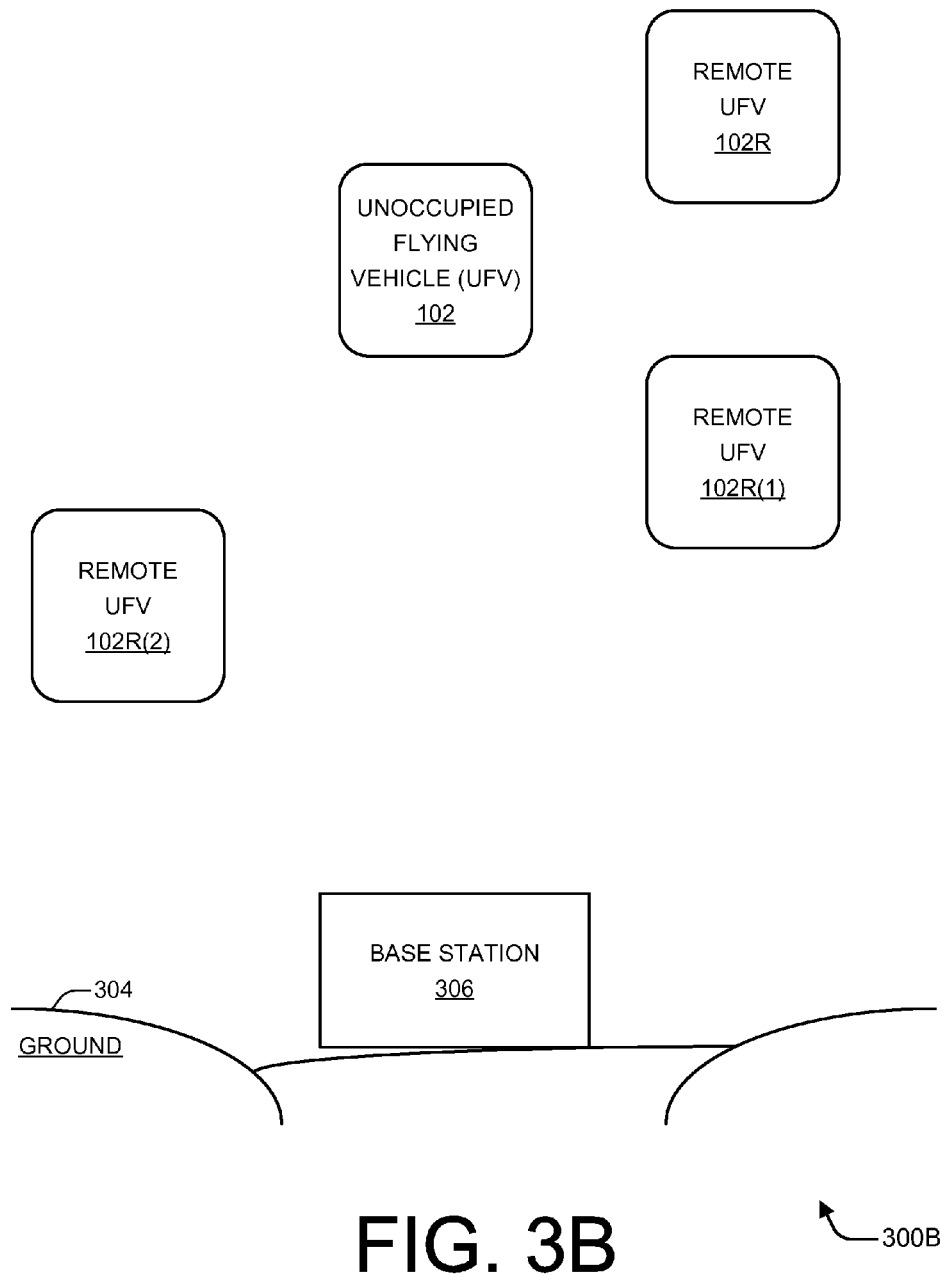
Figure 3C:
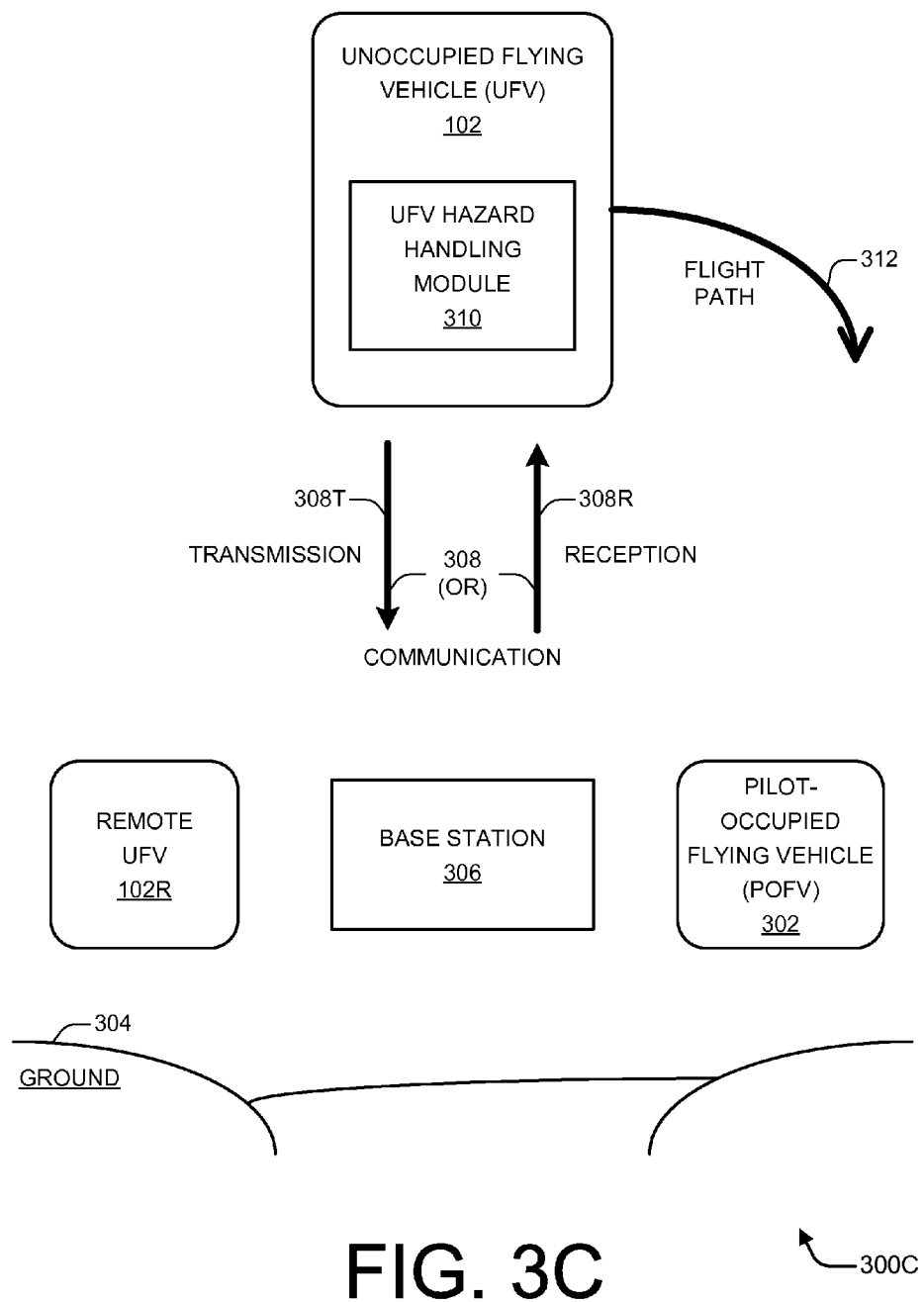

FIGS. 3A-3C are schematic diagrams 300A-300C, respectively, of example UFV hazard handling scenarios or environments in accordance with certain example embodiments. As shown in FIGS. 3A-3C, by way of example but not limitation, each of schematic diagrams 300A-300C may include at least one unoccupied flying vehicle (UFV) 102, at least one remote UFV 102R, or ground 304. In each scenario or environment of schematic diagrams 300A-300C, at least one UFV 102 may be flying above ground 304 and endeavoring to detect, sense, avoid, manage, mitigate, communicate about, coordinate over, eliminate, predict, remove, account for, remedy aftermath caused by, cooperate to address, or a combination thereof, etc. at least one hazard. For certain example embodiments, hazards may include, but are not limited to, other unoccupied flying vehicles, occupied flying vehicles, ground 304, buildings or other structures (not shown) on ground 304, moving objects, weather conditions, stationary objects, some combination thereof, or so forth. A UFV 102 may be attempting to accomplish a mission, an objective, a task, a combination thereof, or so forth. In operation, a UFV may be in communication with at least one remote UFV, at least one pilot-occupied flying vehicle (POFV), at least one base station (not shown in FIG. 3A), at least one other entity, a combination thereof, or so forth. Although scenarios or environments of schematic diagrams 300A-300C may be shown in the drawings or described herein individually or separately, at least portions or aspects of such scenarios or environments may be implemented or may otherwise occur at least partially jointly, simultaneously in time, overlapping in space, as part of a single or extended operational theater, a combination thereof, or so forth. However, claimed subject matter is not limited to any particular described embodiments, implementations, examples, etc.

FIG. 3A is a schematic diagram 300A of an example UFV hazard handling scenario or environment in accordance with certain example embodiments. As shown in FIG. 3A, by way of example but not limitation, schematic diagram 300A may include at least one UFV 102, at least one remote UFV 102R, at least one pilot-occupied flying vehicle (POFV) 302, or ground 304. More specifically, schematic diagram 300A may include a POFV 302, a first POFV 302(1), or a second POFV 302(2). For certain example embodiments, a POFV 302 may comprise or include a vehicle that is currently being controlled by an onboard human pilot. For certain example embodiments, ground 304 may include or comprise at least a portion of the earth, a landscape, a cityscape, a prairie, a hill, a mountain, a combination thereof, or so forth. However, claimed subject matter is not limited to any particular described embodiments, implementations, examples, etc.

FIG. 3B is a schematic diagram 300B of another example UFV hazard handling scenario or environment in accordance with certain example embodiments. As shown in FIG. 3B, by way of example but not limitation, schematic diagram 300B may include at least one UFV 102, at least one remote UFV 102R, ground 304, or at least one base station 306. More specifically, schematic diagram 300B may include a remote UFV 102R, a first remote UFV 102R(1), or a second remote UFV 102R(2). For certain example embodiments, a base station 306 may comprise or include a machine that is adapted to at least partially control or is capable of controlling a UFV 102 from a distance via at least one wireless communication (not explicitly shown in FIG. 3B). For certain example implementations, a base station 306 may be fixed within a building or on a mobile ground vehicle, may be capable of being hand-held, may be incorporated into or as part of another flying vehicle, a combination thereof, or so forth. For certain example implementations, a base station 306 may include or comprise a handheld controller (e.g., as may be used with an R/C model plane) for actual or near line-of-sight control, a workstation-sized or brief-case-sized controller that is mobile for operation out in the field (e.g., for police or corporate purposes), a larger apparatus that is typically stationary or may be housed in a secret or private building miles from an operational theater (e.g., for military or governmental purposes), a server-sized or distributed apparatus that provides control for a swarm of UFVs (e.g., for careful monitoring of a construction, agricultural, or warehouse site), some combination thereof, or so forth. For certain example embodiments, a base station 306 may be controlling at least one UFV, such as first remote UFV 102R(1) or second remote UFV 102R(2), while not controlling at least one other UFV, such as UFV 102 or remote UFV 102R (although it may be monitoring a UFV without controlling it). However, claimed subject matter is not limited to any particular described embodiments, implementations, examples, etc.

FIG. 3C is a schematic diagram 300C of another example UFV hazard handling scenario or environment in accordance with certain example embodiments. As shown in FIG. 3C, by way of example but not limitation, schematic diagram 300C may include at least one UFV 102, at least one remote UFV 102R, at least one POFV 302, ground 304, at least one base station 306, at least one communication 308, or at least one flight path 312. More specifically, UFV 102 may include at least one UFV hazard handling module 310, or communication 308 may include at least one transmission 308T or at least one reception 308R. For certain example embodiments, a UFV 102 may transmit at least one transmission 308T to or receive at least one reception 308R from at least one of a remote UFV 102R, a POFV 302, a base station 306, a combination thereof, or so forth. For certain example embodiments, a UFV hazard handling module 310 may affect or at least partially control a flight path of a UFV 102 at least partially based on at least one of a transmission 308T or a reception 308R. For certain example embodiments, a flight path 312 may comprise or include a flight trajectory, a heading, a speed, a direction, a velocity, an acceleration, a position, an altitude, a stability level, a destination, a two-dimensional course or a three-dimensional course through air or space, a course through a spherical geometrical space, a time or times at which a course is to be traversed, a time or times at which one or more positions or one or more altitudes are to be attained, a time or times at which other flight characteristic(s) are to be attained, extrapolated position-time stamp pairs based on current flight characteristic(s), extrapolated altitude-time stamp pairs based on current flight characteristic(s), a combination thereof, or so forth. However, claimed subject matter is not limited to any particular described embodiments, implementations, examples, etc.

For certain example embodiments, a remote UFV 102R, a POFV 302, or a base station 306 may engage in at least one communication 308, such as a transmission 308T or a reception 308R, with at least one UFV 102. Although not explicitly shown in schematic diagram 300C, for certain example embodiments, each of remote UFV 102R, POFV 302, or base station 306 may additionally or alternatively exchange at least one communication 308 with at least one other of remote UFV 102R, POFV 302, or base station 306. For certain example implementations, a remote UFV 102R may transmit at least one transmission 308T to or receive at least one reception 308R from at least one of a UFV 102, another remote UFV 102R, a POFV 302, a base station 306, a combination thereof, or so forth. For certain example implementations, a POFV 302 may transmit at least one transmission 308T to or receive at least one reception 308R from at least one of a UFV 102, a remote UFV 102R, another POFV 302, a base station 306, a combination thereof, or so forth. For certain example implementations, a base station 306 may transmit at least one transmission 308T to or receive at least one reception 308R from at least one of a UFV 102, a remote UFV 102R, a POFV 302, another base station 306, a combination thereof, or so forth. However, claimed subject matter is not limited to any particular described embodiments, implementations, examples, etc.

Figure 4:
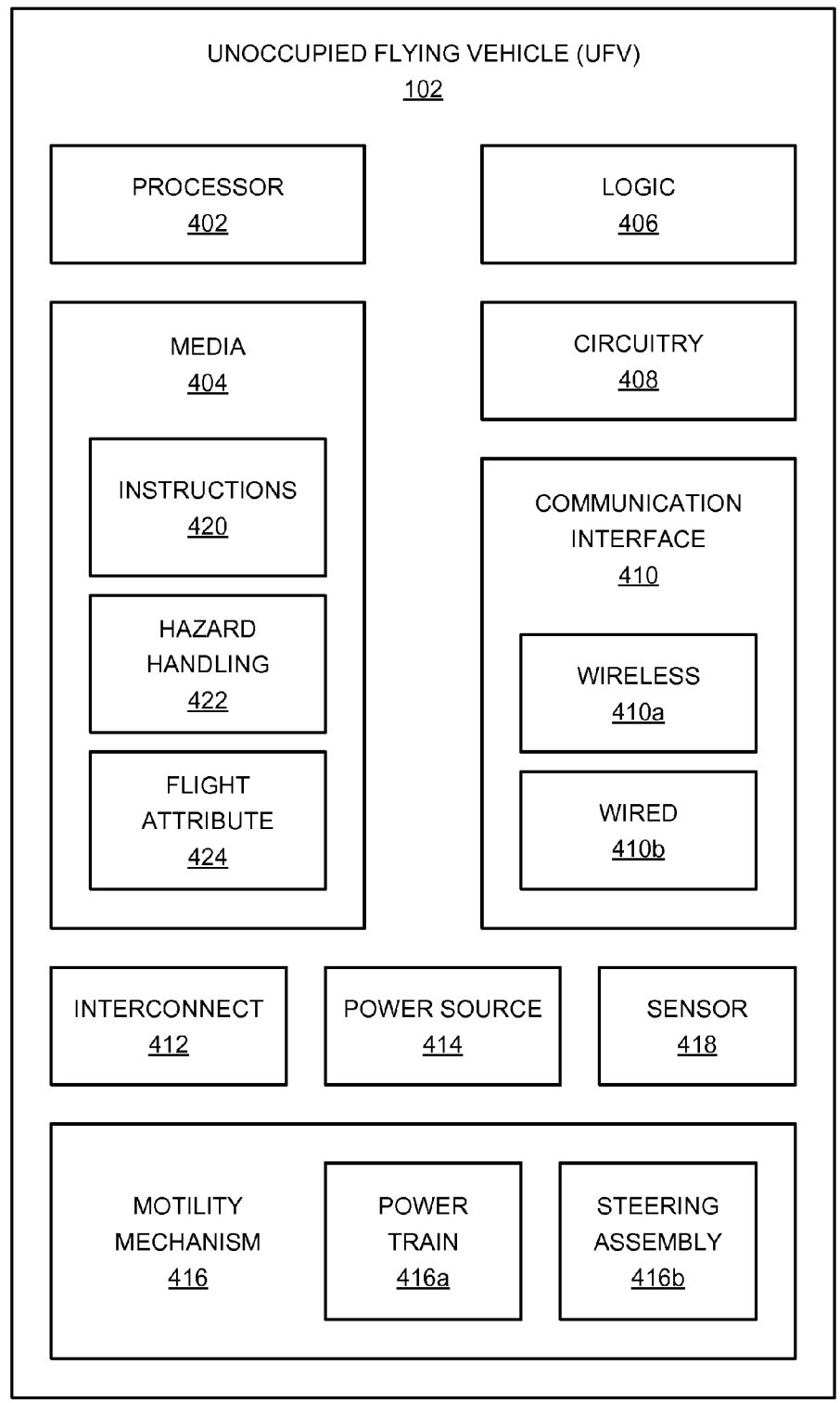
FIG. 4 is a schematic diagram of an example unoccupied flying vehicle (UFV) including one or more example components in accordance with certain example embodiments.

FIG. 4 is a schematic diagram 400 of an example unoccupied flying vehicle (UFV) including one or more example components in accordance with certain example embodiments. As shown in FIG. 4, a UFV 102 may include one or more components such as: at least one processor 402, one or more media 404, logic 406, circuitry 408, at least one communication interface 410, at least one interconnect 412, at least one power source 414, at least one motility mechanism 416, one or more sensors 418, some combination thereof, or so forth. Furthermore, as shown in schematic diagram 400, one or more media 404 may include one or more instructions 420, at least one hazard handling 422 routine, one or more flight attributes 424, some combination thereof, or so forth; a communication interface 410 may include at least one wireless communication interface 410a, at least one wired communication interface 410b, some combination thereof, or so forth; or a motility mechanism 416 may include at least one power train 416a, at least one steering assembly 416b, some combination thereof, or so forth. However, a UFV 102 may alternatively include more, fewer, or different component(s) from those that are illustrated without departing from claimed subject matter.

For certain example embodiments, a UFV 102 may include or comprise at least one machine that is capable of flight, flight control processing, (local) flight control, some combination thereof, or so forth. UFV 102 may include, for example, a computing platform or any electronic device having at least one processor or memory. Processor 402 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one hazard handling 422 routine, which may at least partially form at least a portion of instructions 420; one or more flight attributes 424; some combination thereof; or so forth. Instructions 420 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 420 by one or more processors 402 may transform at least a portion of UFV 102 into a special-purpose computing device, apparatus, platform, some combination thereof, or so forth. Instructions 420 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. A hazard handling 422 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings or that are directed toward detecting, sensing, avoiding, managing, mitigating, communicating about, coordinating over, eliminating, predicting, removing, accounting for, remedying aftermath caused by, cooperating to address, or a combination thereof, etc. at least one hazard. A flight attribute 424 may include, for example, data describing or representing at least one flight attribute of a UFV, such as one or more flight characteristics, one or more flight capabilities, a combination thereof, or so forth. Additionally or alternatively, at least a portion of flight attributes 424 may be at least partially accessible to or integrated with hazard handling 422.

For certain example embodiments, logic 406 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 includes at least one physical or hardware component or aspect.

For certain example embodiments, one or more communication interfaces 410 may provide one or more interfaces between UFV 102 and another machine or a person/operator. With respect to a person/operator, a communication interface 410 may include, by way of example but not limitation, a screen, a speaker, keys/buttons, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, or a combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of UFV 102. Interconnect 412 may include, by way of example but not limitation, one or more buses, channels, switching fabrics, some combination thereof, or so forth. Although not explicitly illustrated in FIG. 4, one or more components of UFV 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of UFV 102. Power source 414 may include, by way of example but not limitation, a battery, a power connector, a solar power source or charger, a mechanical power source or charger, a fuel source, a generator, an engine, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, an altimeter, an airspeed detector, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may include, by way of example but not limitation, an image/video, a sound recording, an acceleration value, a temperature, one or more SPS coordinates, a barometric pressure, a humidity level, a compass direction, an altitude, an airspeed, a gyroscopic value, a magnetic reading, a pressure value, an oscillation value, an ambient light reading, inertial readings, touch detections, proximate object location, flex detections, some combination thereof, or so forth.

For certain example embodiments, a motility mechanism 416 may enable UFV 102 to fly, overcome gravitational forces, overcome wind resistance or drag, accelerate, avoid a hazard, some combination thereof, or so forth. For certain example embodiments, a power train 416a of a motility mechanism 416 may include one or more components that work separately or at least partially together to transform or convert stored energy into kinetic energy in order to propel UFV 102. For certain example implementations, a power train 416a may include at least one engine, at least one transmission, one or more blades or propellers, at least one motor, some combination thereof, or so forth. For certain example embodiments, a steering assembly 416b of a motility mechanism 416 may include one or more components that work separately or at least partially together to transform propulsive kinetic energy into forward, backward, up, down, right, left, a combination thereof, etc. movement or some other directionality change for a UFV. For certain example implementations, a steering assembly 416b may include at least one aileron, at least one rudder, at least one elevator, one or more blades or propellers, at least one transmission that routes power to different motors or other propulsive components, at least one rotor disk tilter, at least one blade pitch angle changer, or a combination thereof, or so forth. Although illustrated separately in schematic diagram 400, power train 416a and steering assembly 416b may be implemented at least partially jointly to realize motility mechanism 416.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a photodetector may function as a wireless communication interface 410a or a sensor 418. Additionally or alternatively, one or more instructions 420 may function to realize or embody at least part of hazard handling 422 or flight attributes 424.

It should also be understood that for certain example implementations components that are illustrated in schematic diagram 400 or described herein may or may not be integral with or integrated into or onto a UFV 102. For example, a component may be removably connected to a UFV 102, a component may be wirelessly coupled to a UFV 102, some combination thereof, or so forth. By way of example only, instructions 420 may be stored on a removable card having at least one medium 404. Additionally or alternatively, at least a portion of a motility mechanism 416, such as an engine or a fuel source, may be detachable from or replaceable with a UFV 102. However, claimed subject matter is not limited to any particular described embodiments, implementations, examples, etc.

Figure 5:
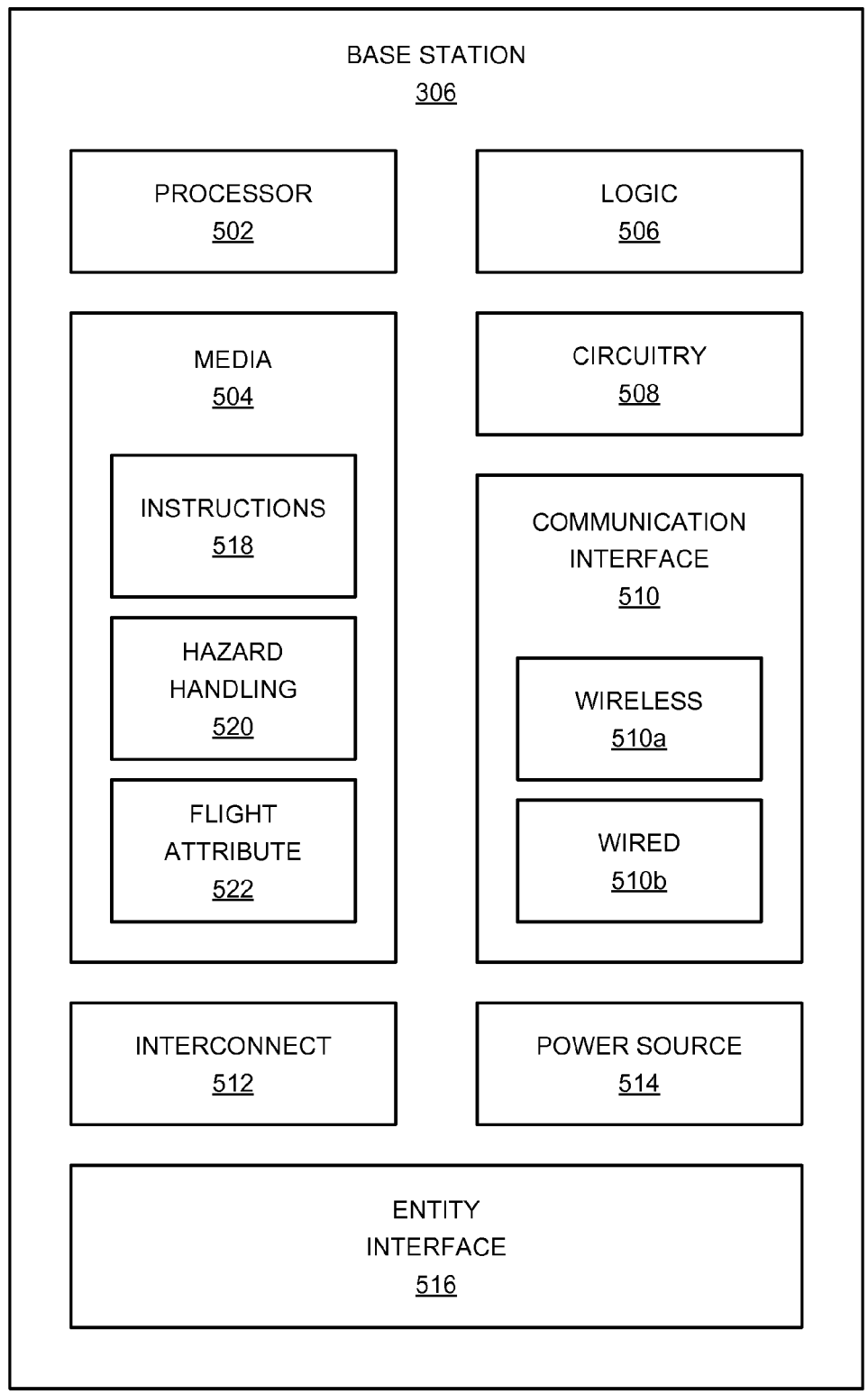
FIG. 5 is a schematic diagram of an example base station, which may be in communication with at least one UFV, including one or more example components for a base station in accordance with certain example embodiments.

FIG. 5 is a schematic diagram 500 of an example base station, which may be in communication with at least one UFV (not shown in FIG. 5), including one or more example components for a base station in accordance with certain example embodiments. As shown in FIG. 5, a base station 306 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may include one or more instructions 518, at least one hazard handling 520 routine, at least one flight attribute 522, some combination thereof, or so forth; or communication interface 510 may include at least one wireless communication interface 510a, at least one wired communication interface 510b, some combination thereof, or so forth. However, a base station 306 may alternatively include more, fewer, or different component(s) from those that are illustrated without departing from claimed subject matter.

For certain example embodiments, a base station 306 may include or comprise at least one machine that is capable of flight control processing, (distant) flight control, some combination thereof, or so forth. Base station 306 may include, for example, a computing platform or any electronic device or devices having at least one processor or memory. Processor 502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one hazard handling 520 routine, which may at least partially form at least a portion of instructions 518; one or more flight attributes 522; some combination thereof; or so forth. Instructions 518 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 518 by one or more processors 502 may transform at least a portion of base station 306 into a special-purpose computing device, apparatus, platform, some combination thereof, or so forth. Instructions 518 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. A hazard handling 520 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings and that are directed toward interacting with at least one UFV to facilitate detecting, seeing, avoiding, managing, mitigating, communicating about, coordinating over, eliminating, predicting, removing, accounting for, remedying aftermath caused by, cooperating to address, or a combination thereof, etc. at least one hazard. A flight attribute 522 may include, for example, data describing or representing at least one flight attribute, such as one or more flight characteristics, one or more flight capabilities, a combination thereof, etc. of at least one UFV that base station 306 is communicating with, is at least partially controlling, is monitoring, some combination thereof, or so forth. Additionally or alternatively, at least a portion of flight attributes 522 may be at least partially accessible to or integrated with hazard handling 520.

For certain example embodiments, logic 506 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 includes at least one physical or hardware component or aspect.

For certain example embodiments, one or more communication interfaces 510 may provide one or more interfaces between base station 306 and another machine or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of base station 306. Interconnect 512 may include, by way of example but not limitation, one or more buses, channels, switching fabrics, local area networks (LANs), storage area networks (SANs), some combination thereof, or so forth. Although not explicitly illustrated in FIG. 5, one or more components of base station 306 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of base station 306. Power source 514 may include, by way of example but not limitation, a power connector for accessing an electrical grid, a fuel cell, a solar power source, one or more batteries, some combination thereof, or so forth.

For certain example embodiments, an entity interface 516 may enable one or more entities (e.g., a person, a group, an electronic agent, a robotic entity, or a combination thereof, etc.) to provide input to or receive output from base station 306. Interactions between an entity and a base station may relate, by way of example but not limitation, to inputting or outputting instructions, commands, settings, flight characteristics, flight capabilities, some combination thereof, or so forth. Certain entity interfaces 516 may enable both entity input and entity output at base station 306 or over at least one network link.

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize or embody at least part of hazard handling 520 or flight attributes 522.

It should also be understood that for certain example implementations components that are illustrated in schematic diagram 500 or described herein may not be integral or integrated with a base station 306. For example, a component may be removably connected to a base station 306, a component may be wirelessly coupled to a base station 306, one or more components of a base station 306 may be geographically distributed or separated from one another, some combination thereof, or so forth. By way of example only, instructions 518 may be stored on one medium 504, and flight attributes 522 (or another portion of instructions 518) may be stored on a different medium 504, which may be part or a same server or a part of a different server of, e.g., a server farm. Additionally or alternatively, respective processor-media pairs, if any, may be physically realized on different or respective server blades or server containers for a base station 306 that is implemented on server hardware. However, claimed subject matter is not limited to any particular described embodiments, implementations, examples, etc.

Figure 6:
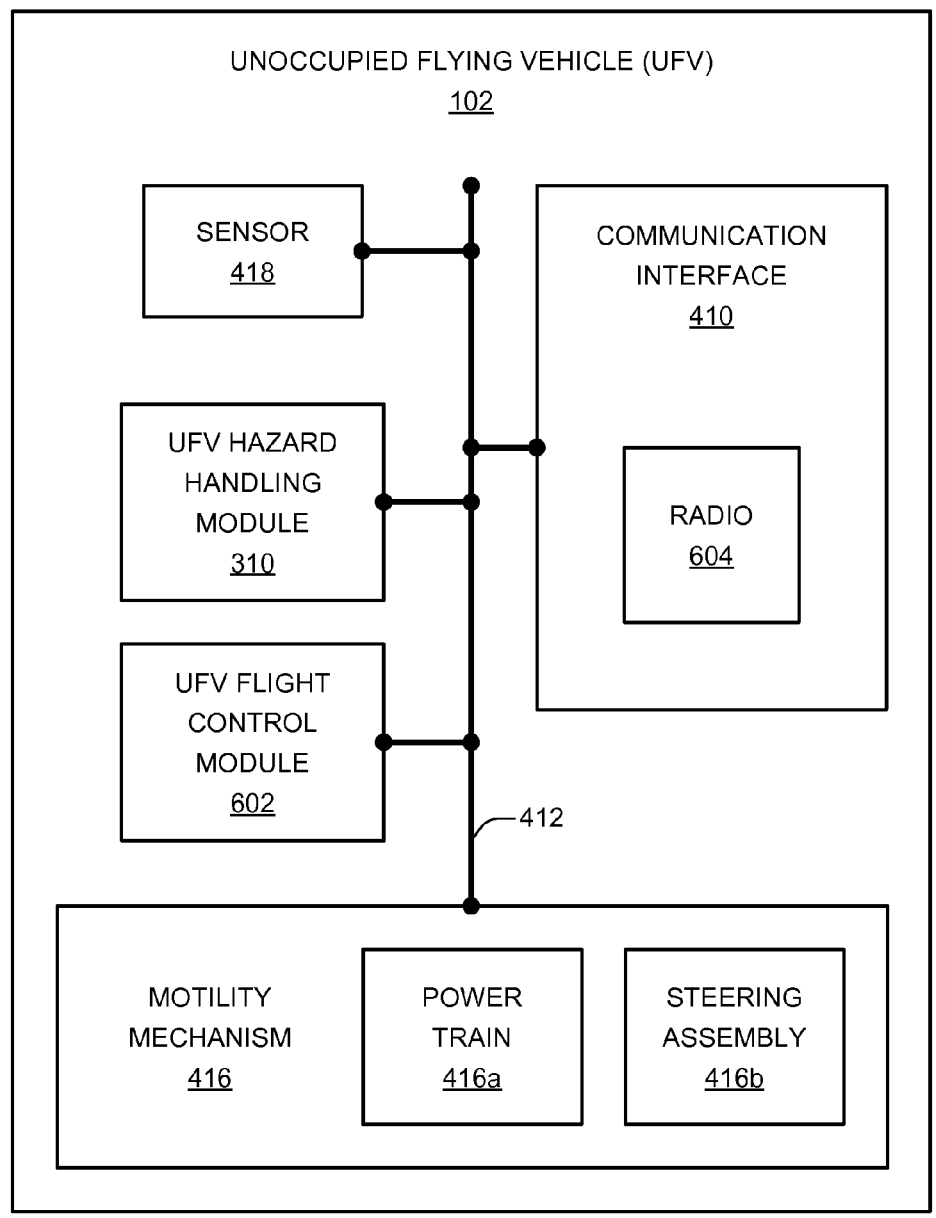
FIG. 6 is a schematic diagram of an example UFV that has one or more functional modules or one or more operational components in accordance with certain example embodiments.

FIG. 6 is a schematic diagram 600 of an example UFV that has one or more functional modules or one or more operational components in accordance with certain example embodiments. As shown in FIG. 6, example UFV 102 of schematic diagram 600 may include, by way of example but not limitation, at least one UFV hazard handling module 310, at least one communication interface 410, at least one interconnect 412, at least one motility mechanism 416, one or more sensors 418, or at least one UFV flight control module 602. More specifically, communication interface 410 may include at least one radio 604, or so forth; or motility mechanism 416 may include at least one power train 416*a*, at least one steering assembly 416*b*, some combination thereof, or so forth. However, a UFV 102 may alternatively include more, fewer, or different module(s) or component(s) from those that are illustrated without departing from claimed subject matter.

For certain example embodiments, a UFV hazard handling module 310 may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling an actual or a potential hazard. Example aspects related to hazard handling in a UFV context are described further herein above and below. Although UFV hazard handling module 310 and UFV flight control module 602 are illustrated separately in schematic diagram 600, they may additionally or alternatively be implemented at least partially in combination, jointly, with an overlapping functionality, some combination thereof, or so forth. For certain example embodiments, and by way of example but not limitation, at least a portion of one or more modules (e.g., module 702, module 704, or a combination thereof, etc.) that are described herein below with particular reference to FIG. 7A may be implemented as at least part of UFV hazard handling module 310, as at least part of UFV flight control module 602, some combination thereof, or so forth. However, claimed subject matter is not limited to any particular described embodiments, implementations, examples, etc.

For certain example embodiments, a module may include or be comprised of at least one processor (e.g., a processor 402 of FIG. 4, etc.), one or more media (e.g., a medium 404 of FIG. 4, etc.), executable instructions (e.g., processor-executable instructions, instructions 420 of FIG. 4, computer-implementable instructions, etc.) incorporated into one or more media, logic (e.g., logic 406 of FIG. 4, etc.), circuitry (e.g., circuitry 408 of FIG. 4, etc.), other described or illustrated component(s), may be comprised as otherwise described herein, some combination thereof, or so forth. For certain example implementations, one or more modules (e.g., a UFV hazard handling module 310, a UFV flight control module 602, or a combination thereof, etc.) of at least one UFV 102 may function or interoperate with one or more modules of at least one remote UFV 102R, at least one POFV 302, at least one base station 306 (e.g., each of FIGS. 3A-3C), or a combination thereof, etc. via at least one radio 604 of UFV 102. However, claimed subject matter is not limited to any particular described embodiments, implementations, examples, etc.

For certain example embodiments, UFV 102 may be in constant, infrequent, regular, irregular, intermittent, occasional, scheduled, unscheduled, a combination thereof, etc. communication with at least one remote UFV 102R, at least one POFV 302, at least one base station 306, or a combination thereof, etc. via radio 604. One or more sensors 418 or radio 604 may feed sensor readings, telemetry, flight attributes, a combination thereof, etc. to UFV hazard handling module 310, UFV flight control module 602, a combination thereof, or so forth. For certain example implementations, UFV hazard handling module 310 may at least make hazard-related flight control decisions or provide flight control input to UFV flight control module 602 with regard to handling actual or potential hazards. For certain example implementations, UFV flight control module 602 may at least partially make flight control decisions or provide flight control commands to motility mechanism 416 so as to implement flight control decisions, including, by way of example but not limitation, based at least partly on flight control input provided by UFV hazard handling module 310. Additionally or alternatively, a UFV hazard handling module 310 may supply flight control input, including by way of example but not limitation with at least one flight control command, directly (e.g., without routing it first through UFV flight control module 602) to motility mechanism 416. To implement flight control decisions, including flight control commands, motility mechanism 416 may employ power train 416*a* to provide at least one propulsive force or may employ steering assembly 416*b* to provide at least one directional change. However, claimed subject matter is not limited to any particular described embodiments, implementations, examples, etc.

Figure 7A:
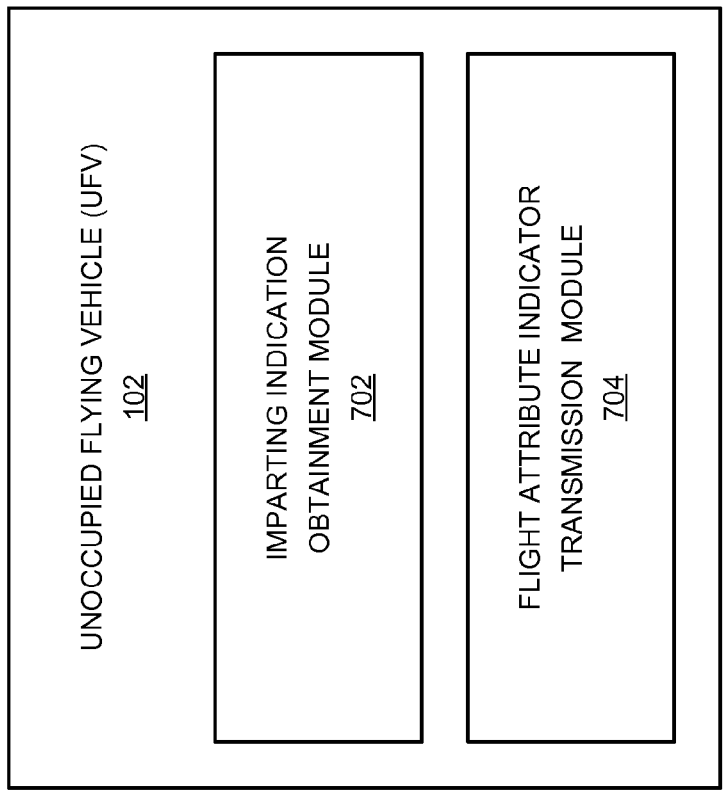
FIG. 7A is a schematic diagram that includes at least one example machine, such as an unoccupied flying vehicle (UFV), that is capable of handling scenarios for inter-vehicle flight attribute communication for a UFV in accordance with certain example embodiments.

FIG. 7A is a schematic diagram 700A that includes at least one example machine, such as an unoccupied flying vehicle (UFV), that is capable of handling scenarios for inter-vehicle flight attribute communication for a UFV in accordance with certain example embodiments. As shown in FIG. 7A, by way of example but not limitation, schematic diagram 700A includes at least one machine that may include an imparting indication obtainment module 702 or a flight attribute indicator transmission module 704. More specifically, schematic diagram 700A may include a machine that includes or comprises at least one UFV 102. By way of example but not limitation, an imparting indication obtainment module 702 or a flight attribute indicator transmission module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, an imparting indication obtainment module 702 or a flight attribute indicator transmission module 704 may be implemented separately or at least partially jointly or in combination. For certain example implementations, an imparting indication obtainment module 702 may be configured to obtain at least one indication related to imparting at least one flight attribute corresponding to a UFV. For certain example implementations, a flight attribute indicator transmission module 704 may be configured to transmit to a remote UFV at least one indicator of at least one flight attribute corresponding to a UFV based at least partially on at least one indication related to imparting the at least one flight attribute. However, claimed subject matter is not limited to any particular described embodiments, implementations, examples, etc.

FIGS. 7B-7E are schematic diagrams 700B-700E that include at least one example machine and that depict example scenarios for implementing inter-vehicle flight attribute communication for an unoccupied flying vehicle (UFV) in accordance with certain example embodiments. As shown in FIGS. 7B-7E, by way of example but not limitation, one or more of schematic diagrams 700B-700E may include at least one UFV 102, at least one remote UFV 102R, at least one flight attribute 706, at least one imparting indication 708, at least one flight attribute indicator 710, at least one obtainment 712, or at least one transmission 714. Each of schematic diagrams 700B-700E may include alternative or additional depictions, which may relate to inter-vehicle flight attribute communication for a UFV, as described herein. In addition to or in alternative to description herein below with specific reference to FIGS. 7B-7E, illustrated aspects of schematic diagrams 700B-700E may be relevant to example description with reference to FIG. 8A-8B, 9A-9D, or 10A. However, claimed subject matter is not limited to any particular described embodiments, implementations, examples, etc.

Figure 7B:
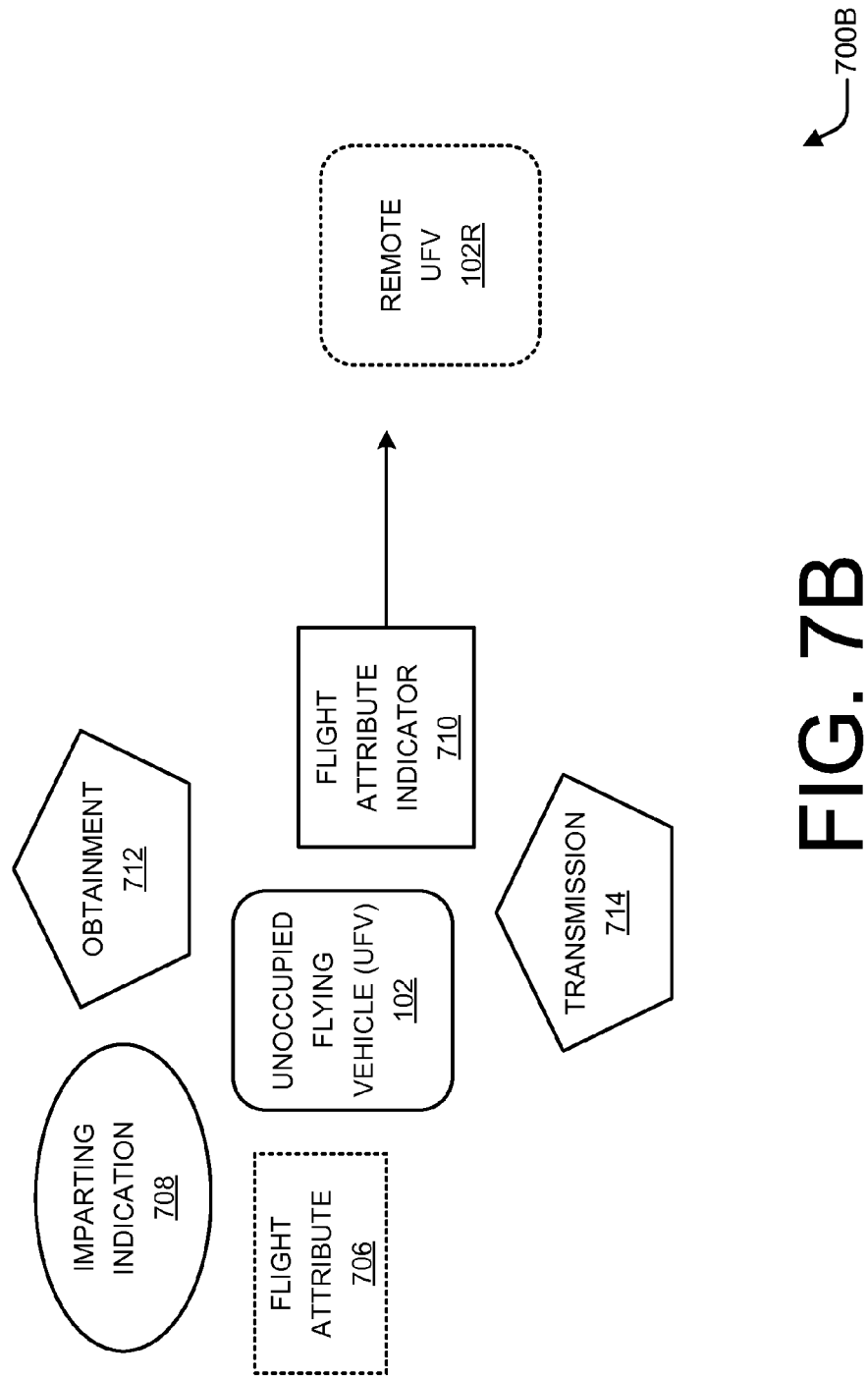
FIGS. 7B-7E are schematic diagrams that include at least one example machine and that depict example scenarios for implementing inter-vehicle flight attribute communication for a UFV in accordance with certain example embodiments.

As shown in FIG. 7B, by way of example but not limitation, schematic diagram 700B may include at least one UFV 102, at least one remote UFV 102R, at least one flight attribute 706, at least one imparting indication 708, at least one flight attribute indicator 710, at least one obtainment 712, or at least one transmission 714. For certain example embodiments, a flight attribute 706 may correspond to UFV 102 or may comprise or include at least one flight characteristic (not shown separately in FIG. 7B), at least one flight capability (not shown separately in FIG. 7B), some combination thereof, or so forth. For certain example embodiments, an imparting indication 708 may comprise or include a received flight attribute inquiry, a received negotiation request, a retrieved flight attribute update procedure, a retrieved flight attribute announcement procedure, some combination thereof, or so forth. For certain example embodiments, at least one imparting indication 708 may be obtained, as at least part of an obtainment 712, from remote UFV 102R via at least one reception 308R (e.g., of FIG. 3C), may be retrieved from one or more media 404 (e.g., of FIG. 4), some combination thereof, or so forth. However, claimed subject matter is not limited to any particular described embodiments, implementations, examples, etc.

For certain example embodiments, a UFV 102 may transmit at least one flight attribute indicator 710, which may be at least partially indicative or representative of at least one flight attribute 706, as at least part of a transmission 714, which may be or may comprise an example of at least part of a transmission 308T (e.g., of FIG. 3C). For certain example implementations, an imparting indication obtainment module 702 (e.g., of FIG. 7A) may effectuate at least part of an obtainment 712. For certain example embodiments, based at least partially on at least one imparting indication 708, a UFV 102 may make a transmission 714 of at least one flight attribute indicator 710 to a remote UFV 102R. For certain example implementations, a flight attribute indicator transmission module 704 (e.g., of FIG. 7A) may effectuate at least part of a transmission 714. However, claimed subject matter is not limited to any particular described embodiments, implementations, examples, etc. Additional or alternative description that may be relevant to schematic diagram 700B is provided herein below with particular reference to one or more of any of FIGS. 8A-8B, FIGS. 9A-9D, or FIG. 10A.

Figure 7C:
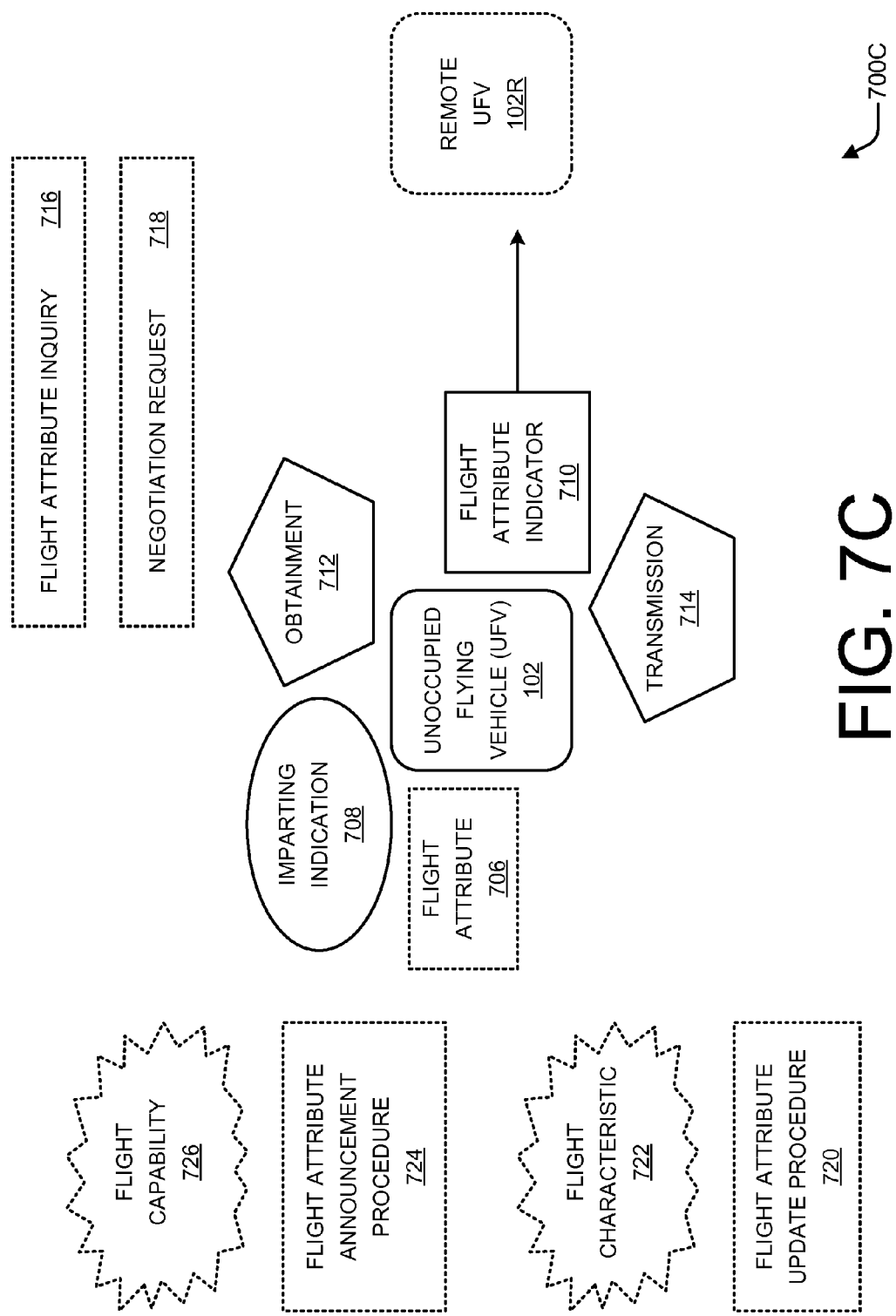

As shown in FIG. 7C, by way of example but not limitation, schematic diagram 700C may include at least one UFV 102, at least one remote UFV 102R, at least one flight attribute 706, at least one imparting indication 708, at least one flight attribute indicator 710, at least one obtainment 712, at least one transmission 714, at least one flight attribute inquiry 716, at least one negotiation request 718, at least one flight attribute update procedure 720, at least one flight characteristic 722, at least one flight attribute announcement procedure 724, or at least one flight capability 726. However, claimed subject matter is not limited to any particular described embodiments, implementations, examples, etc. Additional or alternative description that may be relevant to schematic diagram 700C is provided herein below with particular reference to one or more of any of FIGS. 8A-8B, FIGS. 9A-9D, or FIG. 10A.

Figure 7D:
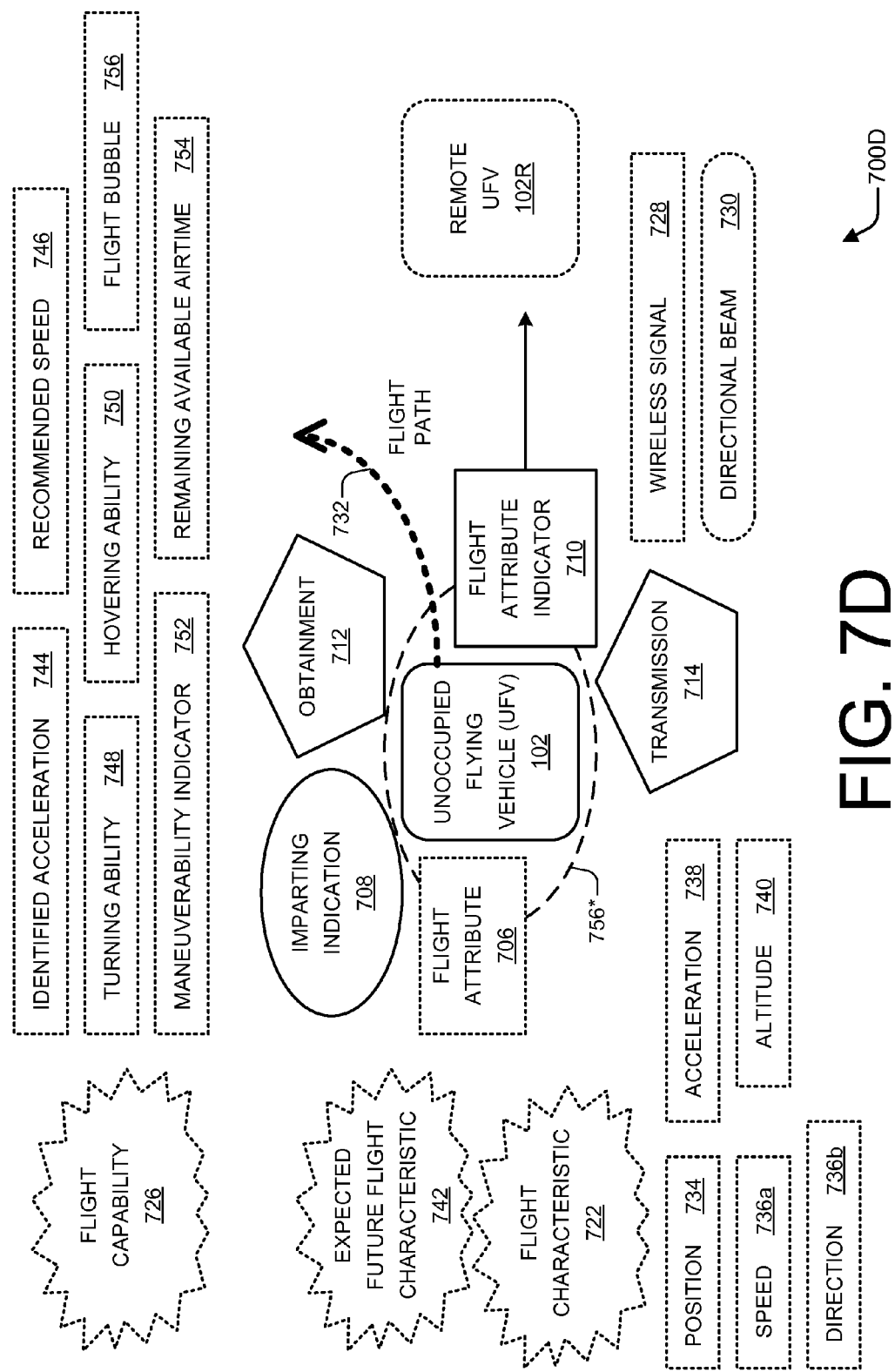

As shown in FIG. 7D, by way of example but not limitation, schematic diagram 700D may include at least one UFV 102, at least one remote UFV 102R, at least one flight attribute 706, at least one imparting indication 708, at least one flight attribute indicator 710, at least one obtainment 712, at least one transmission 714, at least one flight characteristic 722, at least one flight capability 726, at least one wireless signal 728, at least one directional beam 730, at least one flight path 732, at least one position 734, at least one speed 736$a$, at least one direction 736$b$, at least one acceleration 738, at least one altitude 740, at least one expected future flight characteristic 742, at least one identified acceleration 744, at least one recommended speed 746, at least one turning ability 748, at least one hovering ability 750, at least one maneuverability indicator 752, at least one remaining available airtime 754, at least one flight bubble 756 (e.g., with respect to an indicator), or flight bubble 756*(e.g., with respect to a physical shape or actual airspace around a vehicle). However, claimed subject matter is not limited to any particular described embodiments, implementations, examples, etc. Additional or alternative description that may be relevant to schematic diagram 700D is provided herein below with particular reference to one or more of any of FIGS. 8A-8B, FIGS. 9A-9D, or FIG. 10A.

Figure 7E:
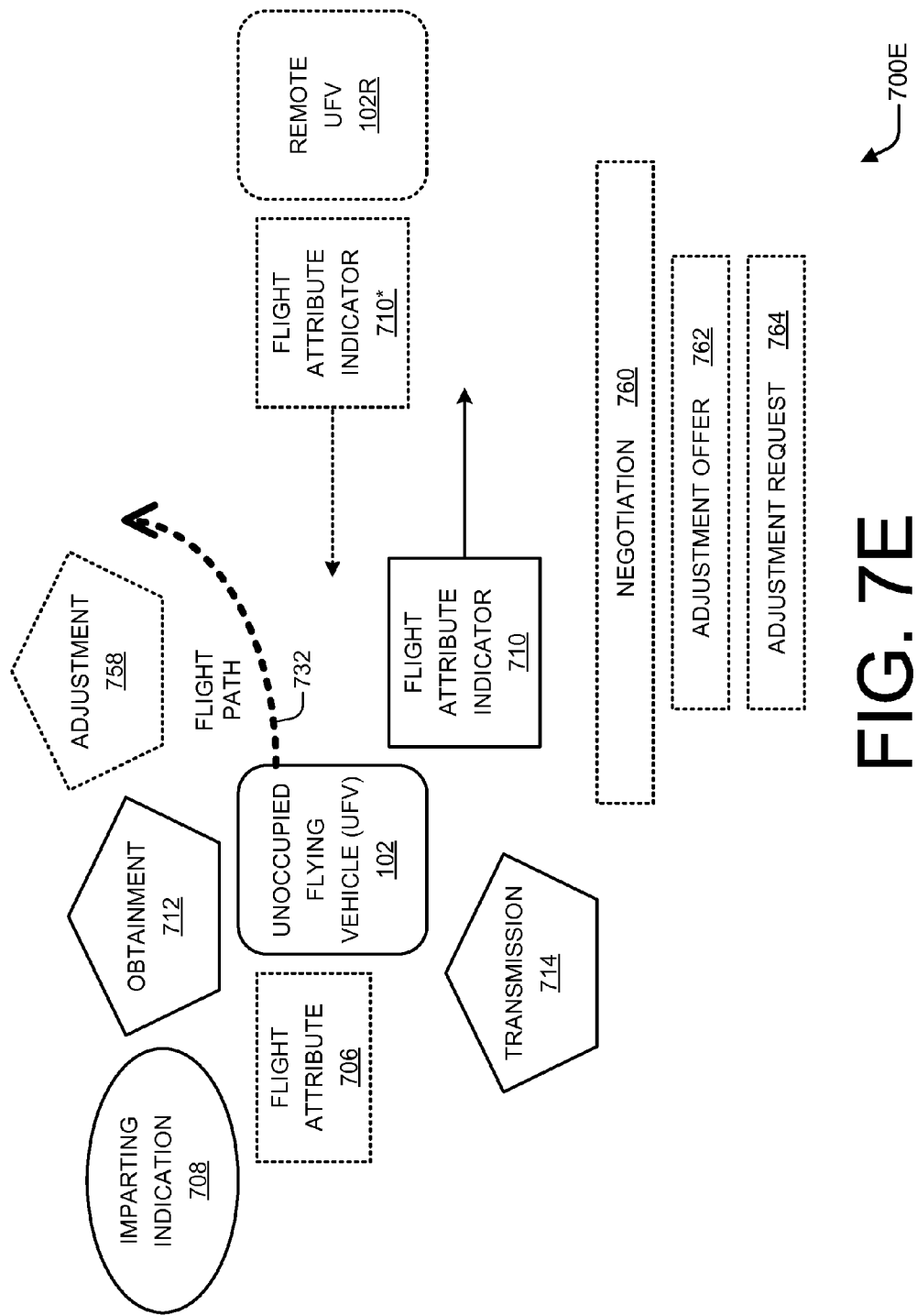

As shown in FIG. 7E, by way of example but not limitation, schematic diagram 700E may include at least one UFV 102, at least one remote UFV 102R, at least one flight attribute 706, at least one imparting indication 708, at least one flight attribute indicator 710 (e.g., with respect to a UFV 102), at least one flight attribute indicator 710*(e.g., with respect to a remote UFV 102R), at least one obtainment 712, at least one transmission 714, at least one flight path 732, at least one adjustment 758, at least one negotiation 760, at least one adjustment offer 762, or at least one adjustment request 764. However, claimed subject matter is not limited to any particular described embodiments, implementations, examples, etc. Additional or alternative description that may be relevant to schematic diagram 700E is provided herein below with particular reference to one or more of any of FIGS. 8A-8B, FIGS. 9A-9D, or FIG. 10A.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 8A is a flow diagram 800A illustrating an example method for at least one machine with regard to inter-vehicle flight attribute communication for a UFV in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one machine (e.g., a UFV 102 or at least a portion thereof).

For certain example embodiments, a method for hazard handling for an unoccupied flying vehicle (UFV) (e.g., that includes, involves, addresses, reacts to, or a combination thereof, etc. or other otherwise handles at least one remote UFV 102R, at least one POFV 302, at least one other object that may present a collision risk, at least one weather-related condition, at least one obstacle to a mission objective, at least one hindrance to accomplishing a task, at least one delay to achieving a goal, or a combination thereof, etc.), which method may be at least partially implemented using hardware (e.g., circuitry, at least one processor, processor-accessible memory, at least one module, or a combination thereof, etc.) of a machine such as a UFV, may include an operation 802 or an operation 804. An operation 802 may be directed at least partially to obtaining at least one indication related to imparting at least one flight attribute corresponding to a UFV. For certain example implementations, at least one machine may obtain (e.g., acquire, ascertain, determine, receive, retrieve, or a combination thereof, etc. via at least one obtainment 712) at least one indication 708 (e.g., a sign, evidence, a showing, a reception, a received communication, a retrieval, a memory location, a data structure, a received flight attribute inquiry, a received negotiation request, a retrieved flight attribute update procedure, a retrieved flight attribute announcement procedure, or a combination thereof, etc.) related to imparting (e.g., disclosing, relating, bestowing, communicating, providing, or a combination thereof, etc.) at least one flight attribute 706 (e.g., a flying capability, an identification of a craft category, an identification of a craft owner or operator, an indication of a flight path, a description of a flight purpose, a flight trajectory, a description of a flying state, a specified flight performance ability, an aircraft type, an altitude or location restriction, a safe acceleration level, an acceleration, a stability rating, a payload, an intended destination, a flight characteristic, a flight capability, or a combination thereof, etc.) corresponding to a UFV 102. By way of example but not limitation, at least one UFV may obtain at least one indication related to imparting at least one flight attribute corresponding to a UFV (e.g., e.g., a local UAV may receive a request for a flight attribute or acquire a disclosure schedule identifying a flight attribute, such as a current speed or a maximum vertical acceleration of the local UAV, that is to be shared or disseminated). However, claimed subject matter is not limited to any particular described embodiments, implementations, examples, etc.

For certain example embodiments, an operation 804 may be directed at least partially to transmitting to a remote UFV at least one indicator of the at least one flight attribute corresponding to the UFV based at least partially on the at least one indication related to imparting the at least one flight attribute. For certain example implementations, at least one machine may transmit (e.g., send, communicate by wire, communicate wirelessly, frequency up-convert, modulate, encode, propagate, emanate from an emitter or antenna, or a combination thereof, etc. via at least one transmission 714) to a remote UFV 102R at least one indicator 710 (e.g., a description, a designation, an expression, a representation, an indirect identification, a direct identification, a reference, a code providing a linkage to, a signal, a value, or a combination thereof, etc.) of at least one flight attribute 706 corresponding to a UFV 102 based at least partially on at least one indication 708 related to imparting at least one flight attribute 706. By way of example but not limitation, at least one UFV may transmit to a remote UFV at least one indicator of the at least one flight attribute corresponding to the UFV based at least partially on the at least one indication related to imparting the at least one flight attribute (e.g., a local UAV may transmit to a remote UAV a value of or a reference to a flight attribute, such as a current altitude or a turning ability, wherein the remote UAV may or may not have made a previous inquiry regarding the flight attribute). However, claimed subject matter is not limited to any particular described embodiments, implementations, examples, etc.

FIG. 8B depicts example additions or alternatives for a flow diagram of FIG. 8A in accordance with certain example embodiments. As illustrated, a flow diagram of FIG. 8B may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of a flow diagram of FIG. 8B may be performed so as to be fully or partially overlapping with other operation(s). For certain example embodiments, one or more operations of flow diagram 800B (of FIG. 8B) may be performed by at least one machine (e.g., a UFV 102 or at least a portion thereof).

FIG. 8B illustrates a flow diagram 800B having example operations 810, 812, 814, or 816. For certain example embodiments, an operation 810 may be directed at least partially to wherein the obtaining at least one indication related to imparting at least one flight attribute corresponding to a UFV (of operation 802) includes receiving from the remote UFV at least one flight attribute inquiry. For certain example implementations, at least one machine may receive (e.g., accept, decode, demodulate, down-convert, detect, obtain from or via a communication, route from an antenna, or a combination thereof, etc.) from a remote UFV 102R at least one flight attribute inquiry 716 (e.g., a query regarding, an interrogation about, a request for, or a combination thereof, etc. directed to one or more flight attributes 706). By way of example but not limitation, at least one UFV may receive from the remote UFV at least one flight attribute inquiry (e.g., a local UAV may receive from a remote UAV an inquiry asking the local UAV to provide to the remote UAV a flight attribute, such as a flight characteristic or a flight attribute, corresponding to the local UAV). However, claimed subject matter is not limited to any particular described embodiments, implementations, examples, etc.

For certain example embodiments, an operation 812 may be directed at least partially to wherein the obtaining at least one indication related to imparting at least one flight attribute corresponding to a UFV (of operation 802) includes receiving from the remote UFV at least one negotiation request for a flight path adjustment. For certain example implementations, at least one machine may receive (e.g., accept, decode, demodulate, down-convert, detect, obtain from or via a communication, route from an antenna, or a combination thereof, etc.) from a remote UFV 102R at least one negotiation request 718 (e.g., a communication or exchange asking to discuss suggestions, options, possibilities, or a combination thereof, etc.) for a flight path adjustment (e.g., a change to, a modification to, a deviation for, or a combination thereof, etc. at least one flight path 312 of a local or a remote UFV, such as by changing a spatial location of a flight path or a time at which a trajectory of a flight path is to be traversed). By way of example but not limitation, at least one UFV may receive from the remote UFV at least one negotiation request for a flight path adjustment (e.g., a local UAV may receive from a remote UAV a request to begin negotiating between or among at least the local UAV and the remote UAV for the local UAV to adjust its flight path or for the remote UAV to adjust its flight path to avoid a potential collision or to cooperatively achieve a goal). However, claimed subject matter is not limited to any particular described embodiments, implementations, examples, etc.

For certain example embodiments, an operation 814 may be directed at least partially to wherein the obtaining at least one indication related to imparting at least one flight attribute corresponding to a UFV (of operation 802) includes retrieving from at least one memory at least a portion of at least one flight attribute update procedure that includes at least one plan for imparting one or more flight characteristics. For certain example implementations, at least one machine may retrieve (e.g., acquire, read, extract, load, or a combination thereof, etc.) from at least one memory (e.g., a processor register, a cache memory, RAM, flash memory, or a combination thereof, etc., such as for media 404 of FIG. 4) at least a portion of at least one flight attribute update procedure 720 (e.g., a schedule of flight characteristic sharings or disseminations, an agreed-upon or known channel for disseminating flight attributes, a mandated flight attribute beacon, a standardized broadcast of one or more prescribed flight characteristics that are to be disseminated, a stored or broadcast plan for disseminating, flight attributes, a time or channel for sending a recently-acquired flight characteristic to a remote UFV that previously-inquired about it or them, or a combination thereof, etc.) that includes at least one plan (e.g., a time, a schedule, a channel, a direction, a content, or a combination thereof, etc.) for imparting one or more flight characteristics 722 (e.g., a description of flying state, an indication of flight path, a flight trajectory, a position, an altitude, a speed, a direction, a velocity, an acceleration, a current stability level, an intended destination, or a combination thereof, etc.). By way of example but not limitation, at least one UFV may retrieve from at least one memory at least a portion of at least one flight attribute update procedure that includes at least one plan for imparting one or more flight characteristics (e.g., a local UAV may retrieve from an onboard cache memory a time to transmit, such as 12:30 p.m. or every minute, or a specific flight characteristic, such as velocity or position, that is to be transmitted). However, claimed subject matter is not limited to any particular described embodiments, implementations, examples, etc.

For certain example embodiments, an operation 816 may be directed at least partially to wherein the obtaining at least one indication related to imparting at least one flight attribute corresponding to a UFV (of operation 802) includes retrieving from at least one memory at least a portion of at least one flight attribute announcement procedure that includes at least one plan for imparting one or more flight capabilities. For certain example implementations, at least one machine may retrieve (e.g., acquire, read, extract, load, or a combination thereof, etc.) from at least one memory (e.g., a processor register, a cache memory, RAM, flash memory, or a combination thereof, etc., such as for media 404 of FIG. 4) at least a portion of at least one flight attribute announcement procedure 724 (e.g., a schedule of flight capability broadcasts, an agreed-upon or known channel for sharing or disseminating flight attributes, a mandated flight attribute beacon, a standardized broadcast for one or more prescribed flight capabilities that are to be disseminated, a stored or broadcast plan for sharing flight attributes, or a combination thereof, etc.) that includes at least one plan (e.g., a time, a schedule, a channel, a direction, a content, or a combination thereof, etc.) for imparting one or more flight capabilities 726 (e.g., indication of flying capabilities, a specified flight performance ability, identification of craft or operator, description of flight purpose, an aircraft type, indication of what is achievable in contrast with what may be currently occurring, altitude restrictions, a safe acceleration level, weather constraints on flight adjustments, payload limitations, or a combination thereof, etc.). By way of example but not limitation, at least one UFV may retrieve from at least one memory at least a portion of at least one flight attribute announcement procedure that includes at least one plan for imparting one or more flight capabilities (e.g., a local UAV may retrieve from flash memory a listing of one or more flight capabilities, such as a maximum acceleration or a vehicle craft type, that are to be transmitted at specified times or are to be transmitted if another UAV approaches to a minimum distance range away from the UAV). However, claimed subject matter is not limited to any particular described embodiments, implementations, examples, etc.

FIGS. 9A-9D depict example additions or alternatives for a flow diagram of FIG. 8A in accordance with certain example embodiments. As illustrated, flow diagrams of FIGS. 9A-9D may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9D may be performed so as to be fully or partially overlapping with other operation(s). For certain example embodiments, one or more operations of flow diagrams 900A-900D (of FIGS. 9A-9D) may be performed by at least one machine (e.g., a UFV 102 or at least a portion thereof).

FIG. 9A illustrates a flow diagram 900A having example operations 910 or 912. For certain example embodiments, an operation 910 may be directed at least partially to wherein the transmitting to a remote UFV at least one indicator of the at least one flight attribute corresponding to the UFV based at least partially on the at least one indication related to imparting the at least one flight attribute (of operation 804) includes transmitting to the remote UFV the at least one indicator of the at least one flight attribute corresponding to the UFV via at least one wireless signal. For certain example implementations, at least one machine may transmit to a remote UFV 102R at least one indicator 710 of at least one flight attribute 706 corresponding to a UFV 102 via at least one wireless signal 728 (e.g., a radio frequency (RF) signal, an electromagnetic transmission propagating through air or space or water, a laser beam having information encoded thereon, or a combination thereof, etc.). By way of example but not limitation, at least one UFV may transmit to the remote UFV the at least one indicator of the at least one flight attribute corresponding to the UFV via at least one wireless signal (e.g., a local UAV may transmit a code representative of a flight capability, such as a turning capability, via a laser signal to a remote UAV). However, claimed subject matter is not limited to any particular described embodiments, implementations, examples, etc.

For certain example embodiments, an operation 912 may be directed at least partially to wherein the transmitting to the remote UFV the at least one indicator of the at least one flight attribute corresponding to the UFV via at least one wireless signal (of operation 910) includes transmitting to the remote UFV the at least one indicator of the at least one flight attribute corresponding to the UFV via at least one radio frequency (RF) wireless signal using at least one directional beam. For certain example implementations, at least one machine may transmit to a remote UFV 102R at least one indicator 710 of at least one flight attribute 706 corresponding to a UFV 102 via at least one radio frequency (RF) wireless signal 728 (e.g., a radio wave, an electromagnetic transmission in a radio frequency spectrum, or a combination thereof, etc.) using at least one directional beam 730 (e.g., a transmissive or receptive signal created using a phased array, a spatially-filtered signal, an electromagnetic wave that is directed to cover an intended area while excluding other areas, or a combination thereof, etc.). By way of example but not limitation, at least one UFV may transmit to the remote UFV the at least one indicator of the at least one flight attribute corresponding to the UFV via at least one radio frequency (RF) wireless signal using at least one directional beam (e.g., a local UAV may transmit an RF signal over the air to a remote UAV with a directional, beam-forming antenna with a beam aimed toward the remote UAV and with the RF signal including a numeric value of a flight characteristic, such a current altitude in meters). However, claimed subject matter is not limited to any particular described embodiments, implementations, examples, etc.

FIG. 9B illustrates a flow diagram 900B having example operations 916, 918, 920, 922, 924, or 926. For certain example embodiments, an operation 916 may be directed at least partially to wherein the transmitting to a remote UFV at least one indicator of the at least one flight attribute corresponding to the UFV based at least partially on the at least one indication related to imparting the at least one flight attribute (of operation 804) includes transmitting to the remote UFV at least one indicator of at least one flight characteristic of the UFV, the at least one flight characteristic representative of at least one flight attribute that is changeable by the UFV to adjust a flight path of the UFV. For certain example implementations, at least one machine may transmit to a remote UFV 102R at least one indicator 710 of at least one flight characteristic 722 (e.g., a description of flying state, an indication of flight path, a flight trajectory, a position, an altitude, a speed, a direction, a velocity, an acceleration, a current stability level, an intended destination, or a combination thereof, etc.) of a UFV 102, with at least one flight characteristic 722 representative of at least one flight attribute 706 that is changeable (e.g., able to be decreased, able to be increased, malleable, alterable, capable of being deviated from, or a combination thereof, etc.) by UFV 102 to adjust (e.g., change, decrease, increase, replace, cause a deviation in, adapt, modify, alter, deviate from, add something to, take something away from, or a combination thereof, etc.) a flight path 732 (e.g., a heading, a flight trajectory, a position, an altitude, a speed, a direction a velocity, an acceleration, a stability level, a destination, a course through air or space or a time at which the course is to be traversed, or a combination thereof, etc.) of UFV 102. By way of example but not limitation, at least one UFV may transmit to the remote UFV at least one indicator of at least one flight characteristic of the UFV, with the at least one flight characteristic representative of at least one flight attribute that is changeable by the UFV to adjust a flight path of the UFV (e.g., a local UAV may transmit to a remote UAV at least part of a flight state, such as a current velocity or a current altitude, which flight state may be at least partially changed to affect a flight path of the local UAV). However, claimed subject matter is not limited to any particular described embodiments, implementations, examples, etc.

For certain example embodiments, an operation 918 may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, (of operation 916) includes transmitting to the remote UFV at least one indicator of a position of the UFV. For certain example implementations, at least one machine may transmit to a remote UFV 102R at least one indicator 710 of a position 734 (e.g., at least one location above or on the earth; one or more geographical coordinates; one or more satellite positioning service (SPS) coordinates, such as GPS, GLONASS, or Galileo coordinates, that are at least partially determined using at least one satellite; one or more map coordinates; at least one reference to at least one determinable position, such as a landmark, a waypoint, or an address; one or more cardinal directions in degrees/minutes/seconds; at least one longitude or latitude; or a combination thereof; etc.) of a UFV 102. By way of example but not limitation, at least one UFV may transmit to the remote UFV at least one indicator of a position of the UFV (e.g., a local UAV may transmit to a remote UAV one or more GPS coordinates representative of a location over/on the earth of the local UAV). However, claimed subject matter is not limited to any particular described embodiments, implementations, examples, etc.

For certain example embodiments, an operation 920 may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, (of operation 916) includes transmitting to the remote UFV at least one indicator of at least one of a speed or a direction of the UFV. For certain example implementations, at least one machine may transmit to a remote UFV 102R at least one indicator 710 of at least one of a speed 736a (e.g., an airspeed, an absolute speed, a relative speed, a true airspeed, a closing speed, miles per hour, meters per second, or a combination thereof, etc.) or a direction 736b (e.g., a cardinal direction, a heading, a compass direction, a direction with regard to a known or determinable point of reference, or a combination thereof, etc.) of a UFV 102. By way of example but not limitation, at least one UFV may transmit to the remote UFV at least one indicator of at least one of a speed or a direction of the UFV (e.g., a local UAV may transmit to a remote UAV an airspeed or a heading or a velocity of the local UAV). However, claimed subject matter is not limited to any particular described embodiments, implementations, examples, etc.

For certain example embodiments, an operation 922 may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, (of operation 916) includes transmitting to the remote UFV at least one indicator of an acceleration of the UFV. For certain example implementations, at least one machine may transmit to a remote UFV 102R at least one indicator 710 of an acceleration 738 (e.g., a rate of change in speed, a rate of change in direction, a rate of change in velocity, meters per second per second, one or more values that may be used to calculate an acceleration, or a combination thereof, etc.) of a UFV 102. By way of example but not limitation, at least one UFV may transmit to the remote UFV at least one indicator of an acceleration of the UFV (e.g., a local UAV may transmit to a remote UAV a rate of change in speed or a rate of change in direction that the local UAV is currently undergoing). However, claimed subject matter is not limited to any particular described embodiments, implementations, examples, etc.

For certain example embodiments, an operation 924 may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, (of operation 916) includes transmitting to the remote UFV at least one indicator of an altitude of the UFV. For certain example implementations, at least one machine may transmit to a remote UFV 102R at least one indicator 710 of an altitude 740 (e.g., a height about ground, a height above sea level, one or more altimeter readings, a vertical elevation above a surface, an atmospheric pressure that corresponds to an elevation, one or more values that can be used to calculate an altitude, or a combination thereof, etc.) of a UFV 102. By way of example but not limitation, at least one UFV may transmit to the remote UFV at least one indicator of an altitude of the UFV (e.g., a local UAV may transmit to a remote UAV an elevation in feet that the local UAV is above ground or sea level). However, claimed subject matter is not limited to any particular described embodiments, implementations, examples, etc.

For certain example embodiments, an operation 926 may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, (of operation 916) includes transmitting to the remote UFV at least one indicator of an expected future flight characteristic of the UFV. For certain example implementations, at least one machine may transmit to a remote UFV 102R at least one indicator 710 of an expected (e.g., planned, intended, predicted, predetermined, scheduled, slated, prescribed, known, what will occur if anticipated maneuverings transpire, or a combination thereof, etc.) future (e.g., occurring later, upcoming, happening after a transmission or reception including an indicator of, imminent, impending, to be realized after a current time, or a combination thereof, etc.) flight characteristic 742 of a UFV 102. By way of example but not limitation, at least one UFV may transmit to the remote UFV at least one indicator of an expected future flight characteristic of the UFV (e.g., a local UAV may transmit to a remote UAV a position at which the local UAV anticipates being located if planned maneuvers, if any, are successfully carried out, plus a temporal index as a delta or an absolute time for when the local UAV anticipates achieving the position). However, claimed subject matter is not limited to any particular described embodiments, implementations, examples, etc.

FIG. 9C illustrates a flow diagram 900C having example operations 930, 932, 934, 936, or 938. For certain example embodiments, an operation 930 may be directed at least partially to wherein the transmitting to a remote UFV at least one indicator of the at least one flight attribute corresponding to the UFV based at least partially on the at least one indication related to imparting the at least one flight attribute (of operation 804) includes transmitting to the remote UFV at least one indicator of at least one flight capability corresponding to the UFV, the at least one flight capability representative of a degree to which the UFV is capable of adjusting a flight path of the UFV. For certain example implementations, at least one machine may transmit to a remote UFV 102R at least one indicator 710 of at least one flight capability 726 (e.g., an indication of flying capabilities, a specified flight performance ability, an identification of craft or operator, a description of flight purpose, an aircraft type, an indication of what is achievable in contrast with what may be currently occurring, altitude restrictions, a safe acceleration level, weather constraints, payload limitations, or a combination thereof, etc.) corresponding to a UFV 102, with at least one flight capability 726 representative of (e.g., descriptive of, identifying directly or indirectly, indicative of, signifying, designating, expressing, or a combination thereof, etc.) of a degree (e.g., an extent, a rate, an amount, a length of time, or a combination thereof, etc.) to which UFV 102 is capable of adjusting (e.g., changing, decreasing, increasing, replacing, causing a deviation in, adapting, modifying, altering, deviating from, adding something to, taking something away from, or a combination thereof, etc.) a flight path 732 (e.g., a heading, a flight trajectory, a position, an altitude, a speed, a direction a velocity, an acceleration, a stability level, a destination, a course through air or space or a time at which the course is to be traversed, or a combination thereof, etc.) of UFV 102. By way of example but not limitation, at least one UFV may transmit to the remote UFV at least one indicator of at least one flight capability corresponding to the UFV, with the at least one flight capability representative of a degree to which the UFV is capable of adjusting a flight path of the UFV (e.g., a local UAV may transmit to a remote UAV at least part of a set of parameters restricting or limiting changes to a flight path, such as a maximum acceleration or a minimum altitude, which parameters may affect a rate or an extent to which a local UAV may alter its flight path). However, claimed subject matter is not limited to any particular described embodiments, implementations, examples, etc.

For certain example embodiments, an operation 932 may be directed at least partially to wherein the transmitting to the remote UFV at least one indicator of at least one flight capability corresponding to the UFV, the at least one flight capability representative of a degree to which the UFV is capable of adjusting a flight path of the UFV, (of operation 930) includes transmitting to the remote UFV at least one indicator of an acceleration identified in a specification corresponding to the UFV. For certain example implementations, at least one machine may transmit to a remote UFV 102R at least one indicator 710 of an acceleration 744 (e.g., a rate of change in speed, a rate of change in direction, a rate of change in velocity, meters per second per second, one or more values that may be used to calculate an acceleration, or a combination thereof, etc.) identified in a specification (e.g., an owner's manual, marketing material, a manufacturer's spec sheet, or a combination thereof, etc. that is indicated as a maximum acceleration, a recommended prudent acceleration given particular conditions, or a combination thereof, etc.) corresponding to a UFV 102. By way of example but not limitation, at least one UFV may transmit to the remote UFV at least one indicator of an acceleration identified in a specification corresponding to the UFV (e.g., a local UAV may transmit an acceleration value in m/s/s that is specified in a manufacturer's product description for the local UFV). However, claimed subject matter is not limited to any particular described embodiments, implementations, examples, etc.

For certain example embodiments, an operation 934 may be directed at least partially to wherein the transmitting to the remote UFV at least one indicator of at least one flight capability corresponding to the UFV, the at least one flight capability representative of a degree to which the UFV is capable of adjusting a flight path of the UFV, (of operation 930) includes transmitting to the remote UFV at least one indicator of a maximum recommended speed corresponding to the UFV. For certain example implementations, at least one machine may transmit to a remote UFV 102R at least one indicator 710 of a maximum recommended speed 746 (e.g., a maximum airspeed, a maximum descending speed, a top-end speed according to marketing materials, a recommended speed in an owner's manual, or a combination thereof, etc.) corresponding to a UFV 102. By way of example but not limitation, at least one UFV may transmit to the remote UFV at least one indicator of a maximum recommended speed corresponding to the UFV (e.g., a local UAV may transmit to the remote UAV a model reference number of the local UAV that is associated with a suggested top speed for the local UAV, which remote UAV is able to acquire a value for the top speed using at least the model reference number and a lookup table). However, claimed subject matter is not limited to any particular described embodiments, implementations, examples, etc.

For certain example embodiments, an operation 936 may be directed at least partially to wherein the transmitting to the remote UFV at least one indicator of at least one flight capability corresponding to the UFV, the at least one flight capability representative of a degree to which the UFV is capable of adjusting a flight path of the UFV, (of operation 930) includes transmitting to the remote UFV at least one indicator of a turning ability corresponding to the UFV. For certain example implementations, at least one machine may transmit to a remote UFV 102R at least one indicator 710 of a turning ability 748 (e.g., a turning radius, a banking ability, a radius of turn, a rotational speed, standard rate turn capability, rate one turn (ROT), rate two turn, number of degrees per second, or a combination thereof, etc.) corresponding to a UFV 102. By way of example but not limitation, at least one UFV may transmit to the remote UFV at least one indicator of a turning ability corresponding to the UFV (e.g., a local UAV may transmit to a remote UAV a radius of turn for the local UAV at a given airspeed, with the given airspeed being transmitted or being a known or determinable default airspeed). However, claimed subject matter is not limited to any particular described embodiments, implementations, examples, etc.

For certain example embodiments, an operation 938 may be directed at least partially to wherein the transmitting to the remote UFV at least one indicator of at least one flight capability corresponding to the UFV, the at least one flight capability representative of a degree to which the UFV is capable of adjusting a flight path of the UFV, (of operation 930) includes transmitting to the remote UFV at least one indicator of a hovering ability corresponding to the UFV. For certain example implementations, at least one machine may transmit to a remote UFV 102R at least one indicator 710 of a hovering ability 750 (e.g., an ability or inability to maintain a stable position in the air, an ability or inability to produce substantially stationary flight, a degree or extent to which a craft has such an ability, a Boolean value, a coefficient, or a combination thereof, etc.) corresponding to a UFV 102. By way of example but not limitation, at least one UFV may transmit to the remote UFV at least one indicator of a hovering ability corresponding to the UFV (e.g., a local UAV may transmit to a remote UAV a signal that indicates if the local UAV is capable of hovering in one place over a location on the earth or next to a location above the earth, such as a next to a particular floor of a building). However, claimed subject matter is not limited to any particular described embodiments, implementations, examples, etc.

Figure 9D:
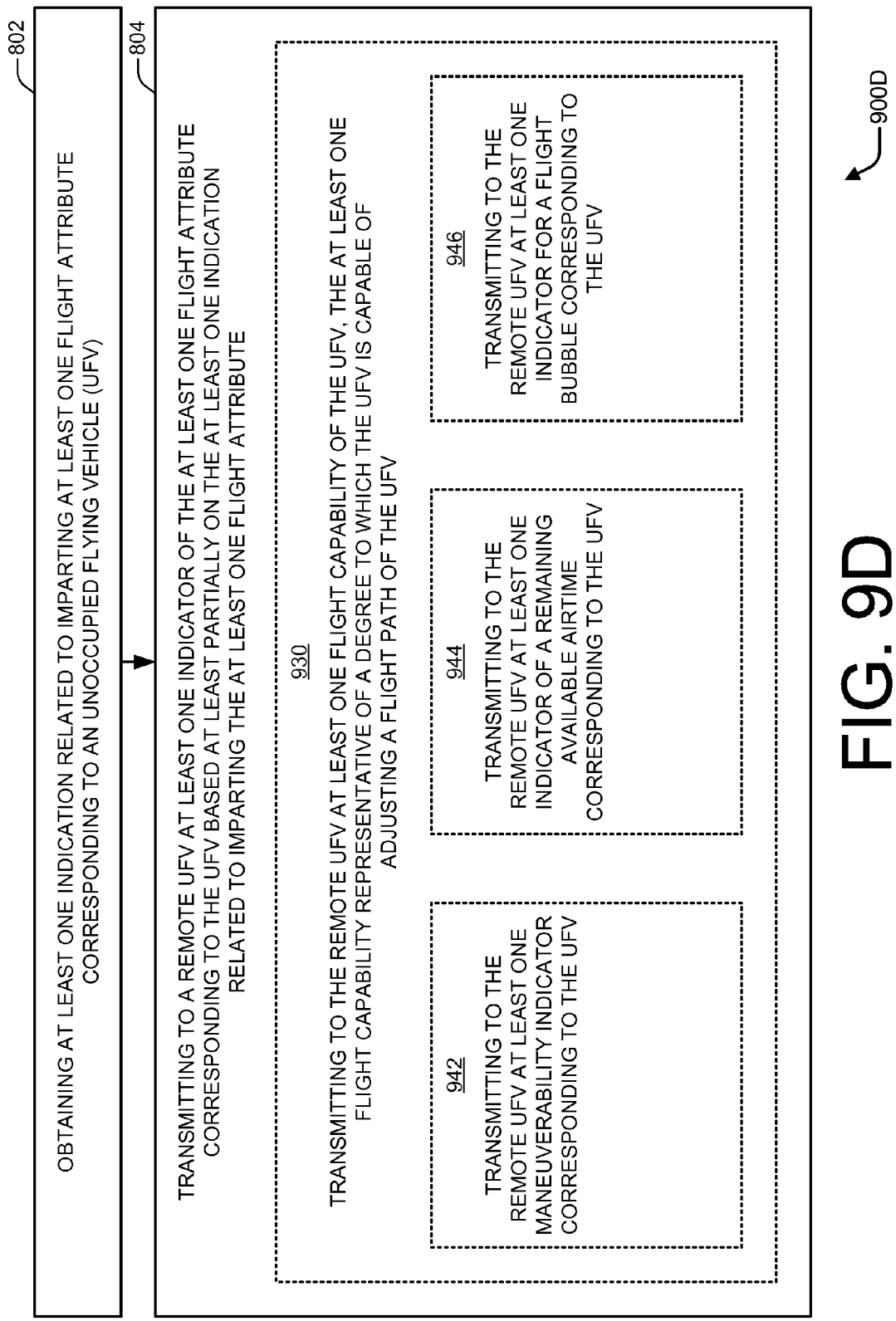

FIG. 9D illustrates a flow diagram 900D having example operations 942, 944, or 946. For certain example embodiments, an operation 942 may be directed at least partially to wherein the transmitting to the remote UFV at least one indicator of at least one flight capability corresponding to the UFV, the at least one flight capability representative of a degree to which the UFV is capable of adjusting a flight path of the UFV, (of operation 930) includes transmitting to the remote UFV at least one maneuverability indicator corresponding to the UFV. For certain example implementations, at least one machine may transmit to a remote UFV 102R at least one maneuverability indicator 752 (e.g., a label or value representative of how well a UFV can adjust its flight path; a relative indication; an absolute indication; a score; a class-like a regulatory certification class for meeting at least one predetermined maneuverability criterion, such as hovering, acceleration, minimum velocity, stability in particular weather conditions, or a combination thereof, etc., or comportment with a set of construction or feature regulations for a craft type, a label equating to a set of minimal standards to achieve the label, or some combination thereof, etc.—; a rating—like an industry certification rating for meeting at least one predetermined maneuverability criterion, such as hovering, acceleration, minimum velocity, stability in particular weather conditions, or a combination thereof, etc., or comportment with a set of flight capabilities, a grade representing a maneuvering score achieved by a make or model of a vehicle, a title equating to a set of minimal standards, such as a minimum negative acceleration, to achieve the title, or some combination thereof, etc.—; a level; an indication of a degree to which a vehicle is agile; a craft category, such as fixed wing, rotary wing, LTA, ornithopter, or a combination thereof, etc.; some combination thereof; or so forth) corresponding to a UFV 102. By way of example but not limitation, at least one UFV may transmit to the remote UFV at least one maneuverability indicator corresponding to the UFV (e.g., a local UAV may transmit to a remote UAV an industry-defined UAV class type having an associated set of performance criteria that a sample/test model comparable to the local UAV is certified to have met). However, claimed subject matter is not limited to any particular described embodiments, implementations, examples, etc.

For certain example embodiments, an operation 944 may be directed at least partially to wherein the transmitting to the remote UFV at least one indicator of at least one flight capability corresponding to the UFV, the at least one flight capability representative of a degree to which the UFV is capable of adjusting a flight path of the UFV, (of operation 930) includes transmitting to the remote UFV at least one indicator of a remaining available airtime corresponding to the UFV. For certain example implementations, at least one machine may transmit to a remote UFV 102R at least one indicator 710 of a remaining available airtime 754 (e.g., a time, a fuel level, a rate of fuel usage, an average rate of fuel usage, values usable to determine a time until flying operations are to cease due to insufficiency of fuel, an amount of jet fuel onboard, an amount of charge left in at least one battery, a rate of charge depletion, a total amount of time flight time remaining, a total amount of time remaining minus time to land safely, a time until a vehicle will be compelled to leave a theater of operations due to insufficiency of fuel, a time until a vehicle will be compelled to cease flight due to insufficiency of fuel, or a combination thereof, etc.) corresponding to a UFV 102. By way of example but not limitation, at least one UFV may transmit to the remote UFV at least one indicator of a remaining available airtime corresponding to the UFV (e.g., a local UAV may transmit to a remote UAV a predicted or estimated number of minutes left that the local UAV is able to stay in the air before fuel becomes sufficiently low that landing becomes imminent). However, claimed subject matter is not limited to any particular described embodiments, implementations, examples, etc.

For certain example embodiments, an operation 946 may be directed at least partially to wherein the transmitting to the remote UFV at least one indicator of at least one flight capability corresponding to the UFV, the at least one flight capability representative of a degree to which the UFV is capable of adjusting a flight path of the UFV, (of operation 930) includes transmitting to the remote UFV at least one indicator for a flight bubble corresponding to the UFV. For certain example implementations, at least one machine may transmit to a remote UFV 102R at least one indicator 710 (e.g., a label representing a standardized classification of flight bubbles, a number representing a minimum distance around a UFV, a shape of a flight bubble, a description of a spatial zone, or a combination thereof, etc.) for a flight bubble 756 (e.g., at least one buffer zone, a shape defined by one or more distances extending from a UFV in one or more different directions, a margin of safety around, an extended area that is to be kept free of objects to facilitate safe flight by a UFV, or a combination thereof, etc.), as shown with an example shape at flight bubble 756*, corresponding to a UFV 102. By way of example but not limitation, at least one UFV may transmit to the remote UFV at least one indicator for a flight bubble corresponding to the UFV (e.g., a local UAV may transmit to a remote UAV at least one measurement representative of at least one dimension, such as a vertical or a longitudinal dimension, of a buffer zone around itself that the local UAV intends to maintain clear of other objects). However, claimed subject matter is not limited to any particular described embodiments, implementations, examples, etc.

Figure 10A:
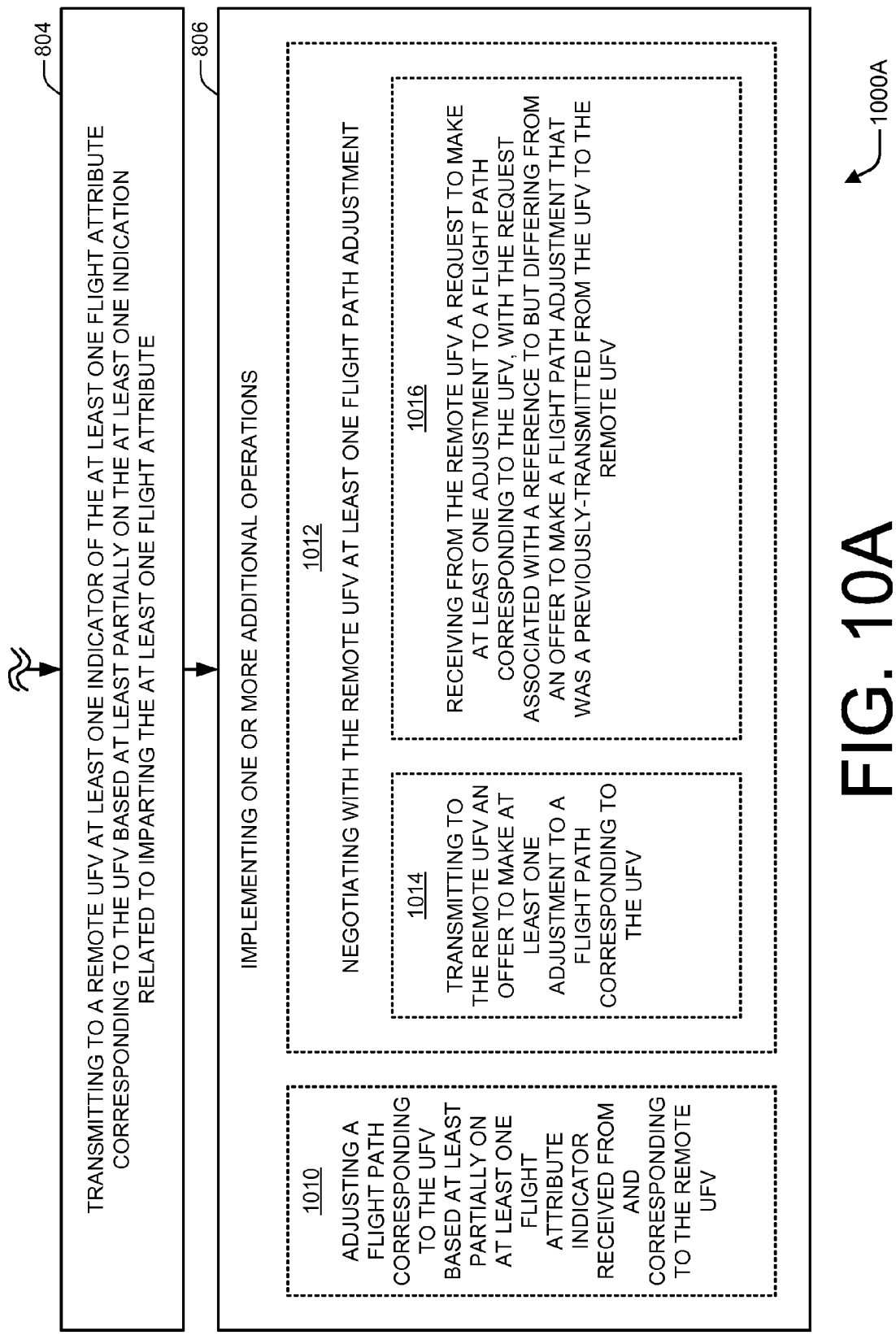
FIG. 10A depicts example additions or alternatives for a flow diagram of FIG. 8A in accordance with certain example embodiments.

FIG. 10A depicts example additions or alternatives for a flow diagram of FIG. 8A in accordance with certain example embodiments. As illustrated, a flow diagram of FIG. 10A may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of a flow diagram of FIG. 10A may be performed so as to be fully or partially overlapping with other operation(s). For certain example embodiments, one or more operations of flow diagrams 1000A (of FIG. 10A) may be performed by at least one machine (e.g., a UFV 102 or at least a portion thereof).

FIG. 10A illustrates a flow diagram 1000A having an example operation 806. For certain example embodiments, an operation 806 may be directed at least partially to wherein a method further includes implementing one or more additional operations. For certain example implementations, at least one machine may implement one or more operations in addition to obtaining (of operation 802, which is not explicitly shown in FIG. 10A) or transmitting (of operation 804). Example additional operations may include, by way of example but not limitation, 1010, 1012, 1014, or 1016 (of FIG. 10A).

FIG. 10A illustrates a flow diagram 1000A having example operations 1010, 1012, 1014, or 1016. For certain example embodiments, an operation 1010 may be directed at least partially to wherein a method of obtaining (of operation 802, which is not explicitly shown in FIG. 10A) or transmitting (of operation 804) further includes (at additional operation 806) adjusting a flight path corresponding to the UFV based at least partially on at least one flight attribute indicator received from and corresponding to the remote UFV. For certain example implementations, at least one machine may adjust (e.g., change, decrease, increase, replace, cause a deviation in, adapt, modify, alter, deviate from, add something to, take something away from, or a combination thereof, etc., such as at least part of an adjustment 758 for) a flight path 732 (e.g., a heading, a flight trajectory, a position, an altitude, a speed, a direction a velocity, an acceleration, a stability level, a destination, a course through air or space or a time at which the course is to be traversed, or a combination thereof, etc.) corresponding to a UFV 102 based at least partially on at least one flight attribute indicator 710*(e.g., a description, a designation, an expression, a representation, an indirect identification, a direct identification, a reference, a code providing a linkage to, a signal, a value, or a combination thereof, etc.) received from and corresponding to a remote UFV 102R. By way of example but not limitation, at least one UFV may adjust a flight path corresponding to the UFV based at least partially on at least one flight attribute indicator received from and corresponding to the remote UFV (e.g., a local UAV may accelerate by increasing an airspeed or changing a direction of travel based on a flight attribute received from a remote UAV that indicates that the remote UAV is a lighter-than-air (LTA) vehicle with limited maneuverability). However, claimed subject matter is not limited to any particular described embodiments, implementations, examples, etc.

For certain example embodiments, an operation 1012 may be directed at least partially to wherein a method of obtaining (of operation 802, which is not explicitly shown in FIG. 10A) or transmitting (of operation 804) further includes (at additional operation 806) negotiating with the remote UFV at least one flight path adjustment. For certain example implementations, at least one machine may negotiate (e.g., conduct, engage in, or participate in an offer and an acceptance (such as an acknowledgment), an offer to adjust a flight path and a rejection, an offer and a counter-offer, a suggestion for an alteration to a planned course, an exchange of signals, a request to adjust a flight path, a rejection of a request, an acceptance of a request, a swapping of offers or intentions or requests, or a combination thereof, etc., via at least one negotiation 760) with a remote UFV 102R at least one flight path adjustment 758 (e.g., a change, decrease, increase, replace, cause a deviation in, adapt, modify, alter, deviate from, add something to, take something away from, or a combination thereof, etc. to a flight path 732 (e.g., a heading, a flight trajectory, a position, an altitude, a speed, a direction a velocity, an acceleration, a stability level, a destination, a course through air or space or a time at which the course is to be traversed, or a combination thereof, etc.)). By way of example but not limitation, at least one UFV may negotiate with the remote UFV at least one flight path adjustment (e.g., a local UAV may send a flight adjustment offer or request to a remote UAV or receive a flight adjustment offer or request from the remote UAV in an effort to reach an agreement on at least one adjustment to a flight path of the local UAV or a flight path of the remote UAV). However, claimed subject matter is not limited to any particular described embodiments, implementations, examples, etc.

For certain example embodiments, an operation 1014 may be directed at least partially to wherein the negotiating with the remote UFV at least one flight path adjustment (of operation 1012) includes transmitting to the remote UFV an offer to make at least one adjustment to a flight path corresponding to the UFV. For certain example implementations, at least one machine may transmit to a remote UFV 102R an offer 762 (e.g., a description of potential change(s) to a flight path in terms of deltas to a current flight path, a description of potential change(s) to a flight path in terms of a new flight path, one or more indications of changes to current or future flight characteristics, a suggestion of changes that may be made, notice of changes that are to be made, or a combination thereof, etc.) to make at least one adjustment to a flight path 732 (e.g., a heading, a flight trajectory, a position, an altitude, a speed, a direction a velocity, an acceleration, a stability level, a destination, a course through air or space or a time at which the course is to be traversed, or a combination thereof, etc.) corresponding to a UFV 102. By way of example but not limitation, at least one UFV may transmit to the remote UFV an offer to make at least one adjustment to a flight path corresponding to the UFV (e.g., a local UAV may send to a remote UAV a communication that suggests that the local UAV may change a flight path of the local UAV by increasing a rate of descent if the remote UAV authorizes, agrees to, acknowledges, or merely fails to affirmatively reject the offer). However, claimed subject matter is not limited to any particular described embodiments, implementations, examples, etc.

For certain example embodiments, an operation 1016 may be directed at least partially to wherein the negotiating with the remote UFV at least one flight path adjustment (of operation 1012) includes receiving from the remote UFV a request to make at least one adjustment to a flight path corresponding to the UFV, with the request associated with a reference to but differing from an offer to make a flight path adjustment that was a previously-transmitted from the UFV to the remote UFV. For certain example implementations, at least one machine may receive (e.g., accept, decode, demodulate, down-convert, detect, obtain from or via a communication, route from an antenna, or a combination thereof, etc.) from a remote UFV 102R a request 764 (e.g., a description of potential change(s) to a flight path in terms of deltas to a current flight path, a description of potential change(s) to a flight path in terms of a new flight path, one or more indications of changes to flight characteristics, a suggestion of changes that may be made, or a combination thereof, etc.) to make at least one adjustment to a flight path 732 corresponding to a UFV 102, with request 764 associated with a reference to (e.g., an identification of, a transaction number, a negotiation code, inclusion as part of an ongoing exchange regarding, or a combination thereof, etc.) but differing from (e.g., being directed to one or more different flight characteristics, suggesting different changes to a same one or more flight characteristics, suggesting no changes instead of changes, or a combination thereof, etc.) an offer 762 (e.g., a suggestion, an expression of a willingness, a description of possible or permitted changes, or a combination thereof, etc.) to make a flight path adjustment (e.g., a change, decrease, increase, replace, cause a deviation in, adapt, modify, alter, deviate from, add something to, take something away from, or a combination thereof, etc. to a flight path 732 (e.g., a heading, a flight trajectory, a position, an altitude, a speed, a direction, a set of flight characteristics, a velocity, an acceleration, a stability level, a destination, a course through air or space or a time at which the course is to be traversed, or a combination thereof, etc.)) that was a previously-transmitted from UFV 102 to remote UFV 102R. By way of example but not limitation, at least one UFV may receive from the remote UFV a request to make at least one adjustment to a flight path corresponding to the UFV, with the request associated with a reference to but differing from an offer to make a flight path adjustment that was a previously-transmitted from the UFV to the remote UFV (e.g., a local UAV may receive from a remote UAV a communication asking the local UAV to veer right by 20 degrees and decelerate to alter a flight path in lieu of increasing a rate of decent, which communication may include an identifier of an earlier communication or may be part of an ongoing exchange, which earlier communication was sent from the local UAV to the remote UAV and suggested that the local UAV could descend more quickly to avoid an airspace conflict between the two UAVs). However, claimed subject matter is not limited to any particular described embodiments, implementations, examples, etc.

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An unoccupied flying vehicle (UFV), the UFV comprising:
   at least one electronic device, the at least one electronic device operable to autonomously control the UFV including at least:
      circuitry configured for obtaining an indication of at least one hazard associated with at least one mission including the UFV and at least one remote UFV;
      circuitry configured for obtaining at least one flight attribute corresponding to the at least one remote UFV;
      circuitry configured for analyzing at least the at least one flight attribute corresponding to the at least one remote UFV and the indication of at least one hazard associated with at least one mission including the UFV and at least one remote UFV;
      circuitry configured for determining a flight path adjustment corresponding to the at least one mission including the UFV and at least one remote UFV based at least partially on the analysis of at least the at least one flight attribute corresponding to the at least one remote UFV and the indication of at least one hazard associated with at least one mission including the UFV and at least one remote UFV;
      circuitry configured for autonomously formulating at least one request to adjust the flight path for transmission to the at least one remote UFV based at least partially on the determined flight path adjustment corresponding to the at least one mission including the UFV and at least one remote UFV; and
      circuitry configured for transmitting to the at least one remote UFV the at least one request to adjust the flight path.

2. The UFV of claim 1, wherein the circuitry configured for obtaining at least one flight attribute corresponding to the at least one remote UFV comprises:
   circuitry configured for receiving from the at least one remote UFV at least one flight attribute inquiry.

3. The UFV of claim 1, wherein the circuitry configured for obtaining at least one flight attribute corresponding to the at least one remote UFV comprises:
   circuitry configured for receiving from the at least one remote UFV at least one negotiation request for a flight path adjustment.

4. The UFV of claim 1, wherein the circuitry configured for obtaining at least one flight attribute corresponding to the at least one remote UFV comprises:
   circuitry configured for retrieving from at least one memory at least a portion of at least one flight attribute update procedure that includes at least one plan for imparting one or more flight characteristics.

5. The UFV of claim 1, wherein the circuitry configured for obtaining at least one flight attribute corresponding to the at least one remote UFV comprises:
   circuitry configured for retrieving from at least one memory at least a portion of at least one flight attribute announcement procedure that includes at least one plan for imparting one or more flight capabilities.

6. The UFV of claim 1, wherein the circuitry configured for transmitting to the at least one remote UFV at least one request to adjust the flight path comprises:
   circuitry configured for transmitting to the at least one remote UFV at least one request to adjust the flight path via at least one wireless signal.

7. The UFV of claim 6, wherein the circuitry configured for transmitting to the at least one remote UFV at least one request to adjust the flight path via at least one wireless signal comprises:
   circuitry configured for transmitting to the at least one remote UFV at least one request to adjust the flight path via at least one radio frequency (RF) wireless signal using at least one directional beam.

8. The UFV of claim 1, wherein:
   the circuitry configured for analyzing at least the at least one flight attribute corresponding to the at least one remote UFV and the indication of at least one hazard associated with at least one mission including the UFV and at least one remote UFV includes circuitry configured for analyzing at least one flight characteristic representative of at least one flight attribute that is changeable by the UFV to adjust a flight path of the UFV; and
   the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one flight characteristic representative of at least one flight attribute that is changeable by the UFV to adjust a flight path of the UFV and the indication of at least one hazard associated with at least one mission including the UFV and at least one remote UFV.

9. The UFV of claim 8, wherein:
the circuitry configured for analyzing at least the at least one flight attribute corresponding to the at least one remote UFV and the indication of at least one hazard associated with at least one mission including the UFV and at least one remote UFV includes circuitry configured for analyzing at least one indicator of a position of the UFV; and
the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of a position of the UFV and the indication of at least one hazard associated with at least one mission including the UFV and at least one remote UFV.

10. The UFV of claim 8, wherein:
the circuitry configured for analyzing at least the at least one flight attribute corresponding to the at least one remote UFV and the indication of at least one hazard associated with at least one mission including the UFV and at least one remote UFV includes circuitry configured for analyzing at least one indicator of at least one of a speed or a direction of the UFV; and
the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of at least one of a speed or a direction of the UFV and the indication of at least one hazard associated with at least one mission including the UFV and at least one remote UFV.

11. The UFV of claim 8, wherein:
the circuitry configured for analyzing at least the at least one flight attribute corresponding to the at least one remote UFV and the indication of at least one hazard associated with at least one mission including the UFV and at least one remote UFV includes circuitry configured for analyzing at least one indicator of an acceleration of the UFV; and
the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of an acceleration of the UFV and the indication of at least one hazard associated with at least one mission including the UFV and at least one remote UFV.

12. The UFV of claim 8, wherein:
the circuitry configured for analyzing at least the at least one flight attribute corresponding to the at least one remote UFV and the indication of at least one hazard associated with at least one mission including the UFV and at least one remote UFV includes circuitry configured for analyzing at least one indicator of an altitude of the UFV; and
the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of an altitude of the UFV and the indication of at least one hazard associated with at least one mission including the UFV and at least one remote UFV.

13. The UFV of claim 8, wherein:
the circuitry configured for analyzing at least the at least one flight attribute corresponding to the at least one remote UFV and the indication of at least one hazard associated with at least one mission including the UFV and at least one remote UFV includes circuitry configured for analyzing at least one indicator of an expected future flight characteristic of the UFV; and
the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of an expected future flight characteristic of the UFV and the indication of at least one hazard associated with at least one mission including the UFV and at least one remote UFV.

14. The UFV of claim 8, wherein:
the circuitry configured for analyzing at least the at least one flight attribute corresponding to the at least one remote UFV and the indication of at least one hazard associated with at least one mission including the UFV and at least one remote UFV includes circuitry configured for analyzing at least one indicator of at least one flight capability including at least one flight capability corresponding to the UFV, the at least one flight capability representative of a degree to which the UFV is capable of adjusting a flight path of the UFV; and
the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of at least one flight capability including at least one flight capability corresponding to the UFV, the at least one flight capability representative of a degree to which the UFV is capable of adjusting a flight path of the UFV and the indication of at least one hazard associated with at least one mission including the UFV and at least one remote UFV.

15. The UFV of claim 14, wherein:
the circuitry configured for analyzing at least one indicator of at least one flight capability including at least one flight capability corresponding to the UFV, the at least one flight capability representative of a degree to which the UFV is capable of adjusting a flight path of the UFV includes circuitry configured for analyzing at least one indicator of an acceleration identified in a specification corresponding to the UFV; and the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of an acceleration identified in a specification corresponding to the UFV and the indication of at least one hazard associated with at least one mission including the UFV and at least one remote UFV.

16. The UFV of claim 14, wherein:

the circuitry configured for analyzing at least one indicator of at least one flight capability including at least one flight capability corresponding to the UFV, the at least one flight capability representative of a degree to which the UFV is capable of adjusting a flight path of the UFV includes circuitry configured for analyzing at least one indicator of a maximum recommended speed corresponding to the UFV; and the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of a maximum recommended speed corresponding to the UFV and the indication of at least one hazard associated with at least one mission including the UFV and at least one remote UFV.

17. The UFV of claim 14, wherein:

the circuitry configured for analyzing at least one indicator of at least one flight capability including at least one flight capability corresponding to the UFV, the at least one flight capability representative of a degree to which the UFV is capable of adjusting a flight path of the UFV includes circuitry configured for analyzing at least one indicator of a turning ability corresponding to the UFV; and the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of a turning ability corresponding to the UFV and the indication of at least one hazard associated with at least one mission including the UFV and at least one remote UFV.

18. The UFV of claim 14, wherein:

the circuitry configured for analyzing at least one indicator of at least one flight capability including at least one flight capability corresponding to the UFV, the at least one flight capability representative of a degree to which the UFV is capable of adjusting a flight path of the UFV includes circuitry configured for analyzing at least one indicator of a hovering ability corresponding to the UFV; and the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of a hovering ability corresponding to the UFV and the indication of at least one hazard associated with at least one mission including the UFV and at least one remote UFV.

19. The UFV of claim 14, wherein:

the circuitry configured for analyzing at least one indicator of at least one flight capability including at least one flight capability corresponding to the UFV, the at least one flight capability representative of a degree to which the UFV is capable of adjusting a flight path of the UFV includes circuitry configured for analyzing at least one maneuverability indicator corresponding to the UFV; and the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one maneuverability indicator corresponding to the UFV and the indication of at least one hazard associated with at least one mission including the UFV and at least one remote UFV.

20. The UFV of claim 14, wherein:

the circuitry configured for analyzing at least one indicator of at least one flight capability including at least one flight capability corresponding to the UFV, the at least one flight capability representative of a degree to which the UFV is capable of adjusting a flight path of the UFV includes circuitry configured for analyzing at least one indicator of a remaining available airtime corresponding to the UFV; and the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator of a remaining available airtime corresponding to the UFV and the indication of at least one hazard associated with at least one mission including the UFV and at least one remote UFV.

21. The UFV of claim 14, wherein :

the circuitry configured for analyzing at least one indicator of at least one flight capability including at least one flight capability corresponding to the UFV, the at least one flight capability representative of a degree to which the UFV is capable of adjusting a flight path of the UFV includes circuitry configured for analyzing at least one indicator for a flight bubble corresponding to the UFV; and the circuitry configured for determining a flight path adjustment corresponding to the at least one mission including the UFV and at least one remote UFV includes circuitry configured for determining a flight path adjustment corresponding to the at least one mission including the UFV and at least one remote UFV based at least partially on the analysis of the at least one indicator for a flight bubble corresponding to the UFV and the indication of at least one hazard associated with at least one mission including the UFV and at least one remote UFV.

22. The UFV of claim 1, further comprising:
circuitry configured for adjusting a flight path corresponding to the UFV based at least partially on at least one flight attribute indicator received from and corresponding to the at least one remote UFV.

23. The UFV of claim 1, further comprising:
circuitry configured for negotiating with the at least one remote UFV at least one flight path adjustment.

24. The UFV of claim 23, wherein the circuitry configured for negotiating with the at least one remote UFV at least one flight path adjustment comprises:
circuitry configured for autonomously formulating an offer to make at least one adjustment to a flight path corresponding to the UFV.

25. The UFV of claim 23, wherein the circuitry configured for negotiating with the at least one remote UFV at least one flight path adjustment comprises:
circuitry configured for receiving from the at least one remote UFV a request to make at least one adjustment to a flight path corresponding to the UFV, with the request associated with a reference to but differing from an offer to make a flight path adjustment that was a previously-transmitted from the UFV to the at least one remote UFV.

26. The UFV of claim 1, further comprising:
circuitry configured for determining at least one mission including the UFV and at least one remote UFV, wherein
the circuitry configured for analyzing at least the at least one flight attribute corresponding to the at least one remote UFV and the indication of at least one hazard associated with at least one mission including the UFV and at least one remote UFV includes circuitry configured for analyzing at least one flight attribute that is changeable by the at least one remote UFV to adjust the flight path of the at least one remote UFV and the indication of at least one hazard associated with at least one mission including the UFV and at least one remote UFV; and
the circuitry configured for determining the at least one mission including the UFV and at least one remote UFV includes circuitry configured for determining the at least one mission including the UFV and at least one remote UFV based at least partially on analysis of the at least one flight attribute that is changeable by the at least one remote UFV to adjust the flight path of the at least one remote UFV and the indication of at least one hazard associated with at least one mission including the UFV and at least one remote UFV.

27. The UFV of claim 1, further comprising:
circuitry configured for determining at least one mission including the UFV and at least one remote UFV, wherein
the circuitry configured for analyzing at least the at least one flight attribute corresponding to the at least one remote UFV and the indication of at least one hazard associated with at least one mission including the UFV and at least one remote UFV includes circuitry configured for analyzing at least one flight capability representative of a degree to which the at least one remote UFV is capable of adjusting the flight path of the at least one remote UFV and the indication of at least one hazard associated with at least one mission including the UFV and at least one remote UFV; and
the circuitry configured for determining the at least one mission including the UFV and at least one remote UFV includes circuitry configured for determining the at least one mission including the UFV and at least one remote UFV based at least partially on analysis of the at least one flight capability representative of a degree to which the at least one remote UFV is capable of adjusting the flight path of the at least one remote UFV and the indication of at least one hazard associated with at least one mission including the UFV and at least one remote UFV.

28. The UFV of claim 1, further comprising:
circuitry configured for determining at least one mission including the UFV and at least one remote UFV, wherein
the circuitry configured for analyzing at least the at least one flight attribute corresponding to the at least one remote UFV and the indication of at least one hazard associated with at least one mission including the UFV and at least one remote UFV includes circuitry configured for analyzing at least one flight attribute that is changeable by the at least one remote UFV to adjust the flight path of the at least one remote UFV and the indication of at least one hazard associated with at least one mission including the UFV and at least one remote UFV; and
the circuitry configured for determining the at least one mission including the UFV and at least one remote UFV includes circuitry configured for determining a request including a description of changes to the flight path corresponding to the remote UFV for transmission to the remote UFV based at least partially on analysis of the at least one flight attribute that is changeable by the at least one remote UFV to adjust the flight path of the at least one remote UFV and the indication of at least one hazard associated with at least one mission including the UFV and at least one remote UFV.

29. The UFV of claim 1, further comprising:
circuitry configured for determining at least one mission including the UFV and at least one remote UFV, wherein
the circuitry configured for analyzing at least the at least one flight attribute corresponding to the at least one remote UFV and the indication of at least one hazard associated with at least one mission including the UFV and at least one remote UFV includes circuitry configured for analyzing at least one flight capability representative of a degree to which the at least one remote UFV is capable of adjusting the flight path of the at least one remote UFV and the indication of at least one hazard associated with at least one mission including the UFV and at least one remote UFV; and
the circuitry configured for determining the at least one mission including the UFV and at least one remote UFV includes circuitry configured for determining a request including a description of changes to the flight path corresponding to the remote UFV for transmission to the remote UFV based at least partially on analysis of the at least one flight capability representative of a degree to which the at least one remote UFV is capable of adjusting the flight path of the at least one remote UFV and the indication of at least one hazard associated with at least one mission including the UFV and at least one remote UFV.

30. The UFV of claim 1, further comprising:
circuitry configured for determining at least one mission including the UFV and at least one remote UFV, wherein
the circuitry configured for analyzing at least the at least one flight attribute corresponding to the at least one remote UFV and the indication of at least one hazard associated with at least one mission including the UFV and at least one remote UFV includes circuitry configured for analyzing one or more of (1) at least one flight attribute that is changeable by the UFV to adjust the flight path of the UFV, (2) at least one flight capability representative of a degree to which the UFV is capable of adjusting the flight path of the UFV, (3) at least one flight attribute that is changeable by the at least one remote UFV to adjust the flight path of the at least one remote UFV, or (4) at least one flight capability representative of a degree to which the at least one remote UFV is capable of adjusting the flight path of the at least one remote UFV and the indication of at least one hazard associated with at least one mission including the UFV and at least one remote UFV; and
the circuitry configured for determining the at least one mission including the UFV and at least one remote UFV includes circuitry configured for determining a request including at least one of (i) an offer, (ii) an offer and an acceptance, (iii) an offer and a counter-offer, (iv) a rejection of an offer to adjust the flight path corresponding to the remote UFV for transmission to the remote UFV based at least partially on analysis of the one or more of (1) at least one flight attribute that is changeable by the UFV to adjust the flight path of the UFV, (2) at least one flight capability representative of a degree to which the UFV is capable of adjusting the flight path of the UFV, (3) at least one flight attribute that is changeable by the at least one remote UFV to adjust the flight path of the at least one remote UFV, or (4) at least one flight capability representative of a degree to which the at least one remote UFV is capable of adjusting the flight path of the at least one remote UFV; and the indication of at least one hazard associated with at least one mission including the UFV and at least one remote UFV.

31. A method comprising:
autonomously controlling an unoccupied flying vehicle (UFV) including at least:
obtaining an indication of at least one hazard associated with at least one mission including the UFV and at least one remote UFV;
obtaining at least one flight attribute corresponding to the at least one remote UFV;
analyzing at least the at least one flight attribute corresponding to the at least one remote UFV and the indication of at least one hazard associated with at least one mission including the UFV and at least one remote UFV;
determining a flight path adjustment corresponding to the at least one mission including the UFV and at least one remote UFV based at least partially on the analysis of at least the at least one flight attribute corresponding to the at least one remote UFV and the indication of at least one hazard associated with at least one mission including the UFV and at least one remote UFV;
autonomously formulating at least one request to adjust the flight path for transmission to the at least one remote UFV based at least partially on the determined flight path adjustment corresponding to the at least one mission including the UFV and at least one remote UFV; and
transmitting to the at least one remote UFV the at least one request to adjust the flight path,
wherein at least one of (i) the obtaining an indication of at least one hazard, (ii) the obtaining at least flight attribute, (iii) the analyzing, (iv) the determining a flight path adjustment, (v) the autonomously formulating at least one request to adjust the flight path, or (vi) the transmitting to the at least one remote UFV the at least one request to adjust the flight path is implemented at least partially by one or more electronic devices of the UFV.

32. A machine comprising:
means for autonomously controlling an unoccupied flying vehicle (UFV) including at least:
means for obtaining an indication of at least one hazard associated with at least one mission including the UFV and at least one remote UFV;
means for obtaining at least one flight attribute corresponding to the at least one remote UFV;
means for analyzing at least the at least one flight attribute corresponding to the at least one remote UFV and the indication of at least one hazard associated with at least one mission including the UFV and at least one remote UFV;
means for determining a flight path adjustment corresponding to the at least one mission including the UFV and at least one remote UFV based at least partially on the analysis of at least the at least one flight attribute corresponding to the at least one remote UFV and the indication of at least one hazard associated with at least one mission including the UFV and at least one remote UFV;
means for autonomously formulating at least one request to adjust the flight path for transmission to the at least one remote UFV based at least partially on the determined flight path adjustment corresponding to the at least one mission including the UFV and at least one remote UFV; and
means for transmitting to the at least one remote UFV the at least one request to adjust the flight path.

* * * * *